US007389214B1

(12) United States Patent
Yelich et al.

(10) Patent No.: US 7,389,214 B1
(45) Date of Patent: Jun. 17, 2008

(54) CATEGORY ANALYSIS IN A MARKET MANAGEMENT

(75) Inventors: David A. Yelich, Atlanta, GA (US); John E. Cunningham, Bloomfield Hills, MI (US); Glenn J. Thomas, Lake Forest, IL (US); Holly H. Stoddard, Marietta, GA (US); David Blaine, Rockville, MD (US); Richard Waugh, Silver Spring, MD (US); Orville Bailey, Potomac, MD (US); Shirish Pareek, Pittsburgh, PA (US); Amy Cutlip Cohen, Silver Spring, MD (US)

(73) Assignees: Accenture, LLP, Palo Alto, CA (US); B2EMarkets, Inc, Rockville, MD (US)

( * ) Notice: Subject to any disclaimer, the term of this patent is extended or adjusted under 35 U.S.C. 154(b) by 0 days.

(21) Appl. No.: 09/562,668

(22) Filed: May 1, 2000

(51) Int. Cl.
*G06G 7/48* (2006.01)
*G06Q 10/00* (2006.01)

(52) U.S. Cl. .................. 703/6; 705/1; 705/400
(58) Field of Classification Search ............ 705/7, 705/30, 1, 400; 703/1, 2, 6, 7; 700/97
See application file for complete search history.

(56) References Cited

U.S. PATENT DOCUMENTS

| | | | | |
|---|---|---|---|---|
| 3,806,705 | A | | 4/1974 | Reilly et al. |
| 4,885,685 | A | * | 12/1989 | Wolfberg et al. ............... 705/14 |
| 5,249,120 | A | * | 9/1993 | Foley ............................ 705/1 |
| 5,373,346 | A | * | 12/1994 | Hocker ........................ 702/188 |
| 5,406,475 | A | | 4/1995 | Kouchi et al. |
| 5,671,360 | A | | 9/1997 | Hambrick et al. |
| 5,748,908 | A | | 5/1998 | Yu |
| 5,765,138 | A | | 6/1998 | Aycock et al. |
| 5,765,143 | A | * | 6/1998 | Sheldon et al. ............... 705/28 |
| 5,798,939 | A | * | 8/1998 | Ochoa et al. ................. 700/286 |
| 5,799,286 | A | * | 8/1998 | Morgan et al. ................ 705/30 |
| 5,884,285 | A | * | 3/1999 | Atkins ........................ 705/36 R |
| 5,940,300 | A | * | 8/1999 | Ozaki .......................... 700/121 |
| 5,966,707 | A | | 10/1999 | Van Huben et al. |
| 5,991,741 | A | * | 11/1999 | Speakman et al. ............ 705/30 |
| 6,014,633 | A | * | 1/2000 | DeBusk et al. ................. 705/7 |
| 6,014,644 | A | * | 1/2000 | Erickson ....................... 705/37 |
| 6,023,683 | A | | 2/2000 | Johnson et al. |
| 6,035,298 | A | | 3/2000 | McKearney |
| 6,038,554 | A | * | 3/2000 | Vig ............................. 705/400 |
| 6,131,087 | A | | 10/2000 | Luke et al. |
| 6,167,378 | A | | 12/2000 | Webber, Jr. |
| 6,167,385 | A | | 12/2000 | Hartley-Urquhart |
| 6,167,406 | A | * | 12/2000 | Hoskins et al. .............. 707/102 |

(Continued)

OTHER PUBLICATIONS

Manhassett, "AVS tunes graph software in Gsharp", Aug. 7, 1995, Electronic Engineering Times, 1 page.*

(Continued)

*Primary Examiner*—Andrew Joseph Rudy
(74) *Attorney, Agent, or Firm*—Oppenheimer Wolff & Donnelly, LLP

(57) ABSTRACT

The present disclosure provides for analyzing expenditures by category. A file including expenditure data relating to spent monies is identified. The expenditure data from the file is extracted. An independent and a dependent variable relating to the expenditure data are determined. The expenditure data is graphed based on the determined variables. Conclusions are displayed based on the expenditure data.

20 Claims, 41 Drawing Sheets

U.S. PATENT DOCUMENTS

| | | | |
|---|---|---|---|
| 6,195,643 B1 | 2/2001 | Maxwell | |
| 6,208,975 B1 | 3/2001 | Bull et al. | |
| 6,236,978 B1 * | 5/2001 | Tuzhilin | 705/26 |
| 6,286,002 B1 | 9/2001 | Axaopoulos et al. | |
| 6,295,513 B1 * | 9/2001 | Thackston | 703/1 |
| 6,321,205 B1 * | 11/2001 | Eder | 705/7 |
| 6,343,275 B1 | 1/2002 | Wong | |
| 6,347,303 B2 * | 2/2002 | Nagai et al. | 705/7 |
| 6,393,406 B1 * | 5/2002 | Eder | 705/7 |
| 6,394,811 B2 * | 5/2002 | Finitzo et al. | 434/262 |
| 6,405,173 B1 * | 6/2002 | Honarvar et al. | 705/7 |
| 6,408,263 B1 | 6/2002 | Summers | |
| 6,446,076 B1 | 9/2002 | Burkey et al. | |
| 6,568,989 B1 * | 5/2003 | Molnar | 451/5 |
| 6,578,142 B1 * | 6/2003 | Anderson et al. | 713/2 |
| 6,591,278 B1 | 7/2003 | Ernst | |
| 6,671,673 B1 * | 12/2003 | Baseman et al. | 705/7 |
| 6,671,818 B1 * | 12/2003 | Mikurak | 714/4 |
| 6,873,963 B1 * | 3/2005 | Westbury et al. | 705/8 |
| 7,127,405 B1 | 10/2006 | Frank et al. | |
| 7,133,846 B1 | 11/2006 | Ginter et al. | |
| 7,249,028 B2 * | 7/2007 | Ibarra et al. | 705/1 |

OTHER PUBLICATIONS

Stoddard, Brooke, "Intergrated modeling", Nov. 1994, American Gas, 5 pages.*

Fowler, Alan, "Operations management and systematic modeling as frameworks for BPR", 1998, International Journal of Operations & Production Management, 17 pages.*

Meil, James P., "The business economist at work: Eaton Corporation," Business Economics; Washington, Jan. 1997.*

Milligan, Brian, "Cessna uses Baldrige process to identify best suppliers," Purchasing; Boston, Apr. 6, 2000.*

Fry, John, "EcoSystems Software Inc. Announces the First Systems Management Products for Client-Server Computing", Aug. 25, 1992, Business Wire, 3 pages.

*Dayco* Statement Regarding Related Applications.

* cited by examiner survey response

Corrugated Paper

Survey Name: Corrugated Packaging
Survey Description: Supplier Survey - Corrugated Paper - Posted 03/16/00

Company Information
Please provide us with some company information including number of employees, number of plants/locations, 1999 annual revenue, year incorporated.

Please answer below in as much detail as possible:

Company: Containers Plus       1999 Annual Revenue: $12 Million
# of employees: 12,864         Year Incorporated: 1980
# of plants/locations: Fargo, ND, Burbank, CA, Montgomery, AL, Racine, WI Jersey City, NJ, Plano, TX

Quality
What kinds of quality control programs do you have in place? What quality certifications do you have?

We have an extensive quality control program to ensure minimum returns and customer satisfaction of our product. For every 100,000 boxes produced our defect rate is 10 boxes. We provide our employees incentives for ensuring quality and a monthly inspection takes place throughout the plant. We are ISO 9000 certified.

Technology
Do you have any innovative solutions or new technologies that make you a leader within your industry?

Containers Plus is definitely a technology leader in the corrugated packaging industry. Top of the line machinery, and robotics enable us to be one of the most successful plants in the nation. Our packaging is always the latest design and is produced the most cost effectively.

Supply Chain
What does the supply chain look like in your industry? Where within the supply chain do you buy from?

Containers Plus manufactures corrugated packaging. We sell directly to the consumer, like yourself, or to a wholesaler that carries many types of corrugated packaging which are all manufactured by many different companies.

help                                                    cancel    save    finish

CATEGORY ANALYSIS IN A MARKET MANAGEMENT

FIELD OF THE INVENTION

The present invention relates to sourcing processes and more particularly to Internet based market management.

BACKGROUND OF THE INVENTION

Commercial sites on the Internet (in particular on the World Wide Web) are known. Typically, Web sites where merchandise or services can be purchased consist of a static description of the goods or services being offered, the price at which such goods or services are being offered, and some type of order form for a customer to enter personal and payment information. Similarly, Web sites soliciting merchandise and services consist of a static description of the goods or services sought, the price at which such goods or services will be purchased at, and some type of order form for a seller to enter personal information.

Such sites are not well suited for the purchase of goods or services that are negotiable, including unique, surplus, high-volume or discontinued items, or negotiable services. The known commercial Web sites are interactive only to the extent that a customer is able to choose a particular item for purchase and to enter payment and shipment information. Such Web sites include so-called "auction" sites such as NetMarket.RTM. (www.netmarket.com), in which users may consecutively enter prices they are willing to pay for specific products, until a set deadline, thus bidding up the price. The product is then sold to the customer with the highest bid. Such "auction" Web sites do not allow the user to negotiate with the vendor, or vice versa. Consequently, there is no manner by which negotiation can take place between the seller and the customer.

Thus, there exists a need in the art for a dynamic and interactive computer-implemented system which is capable of purchasing, through a distributed network such as the Internet, goods and/or services that have negotiable prices.

SUMMARY OF THE INVENTION

The present disclosure provides for analyzing expenditures by category. A file including expenditure data relating to spent monies is identified. The expenditure data from the file is extracted. An independent and a dependent variable relating to the expenditure data are determined. The expenditure data is graphed based on the determined variables. Conclusions are displayed based on the expenditure data.

In one embodiment of the present invention, a user may be allowed to create the file including expenditure data relating to spent monies. In another embodiment, the file may be based on a materials worksheet. Optionally, the file may be based on a services worksheet.

In one aspect of the present invention, the determined variables may include price distribution and total expenditure by suppliers. In another aspect, the displayed conclusions may include recommended issues to consider. Further, a user may be allowed to input conclusions about the graphed expenditure data.

BRIEF DESCRIPTION OF THE DRAWINGS

The invention will be better understood when consideration is given to the following detailed description thereof. Such description makes reference to the annexed drawings wherein:

FIG. 28 shows a screen displayed upon selection of the link to the supplier analysis application from the home page;

FIG. 33 depicts a screen displayed upon selection of the link to the eNegotiation management application;

DETAILED DESCRIPTION OF THE PREFERRED EMBODIMENTS

Figure 1:
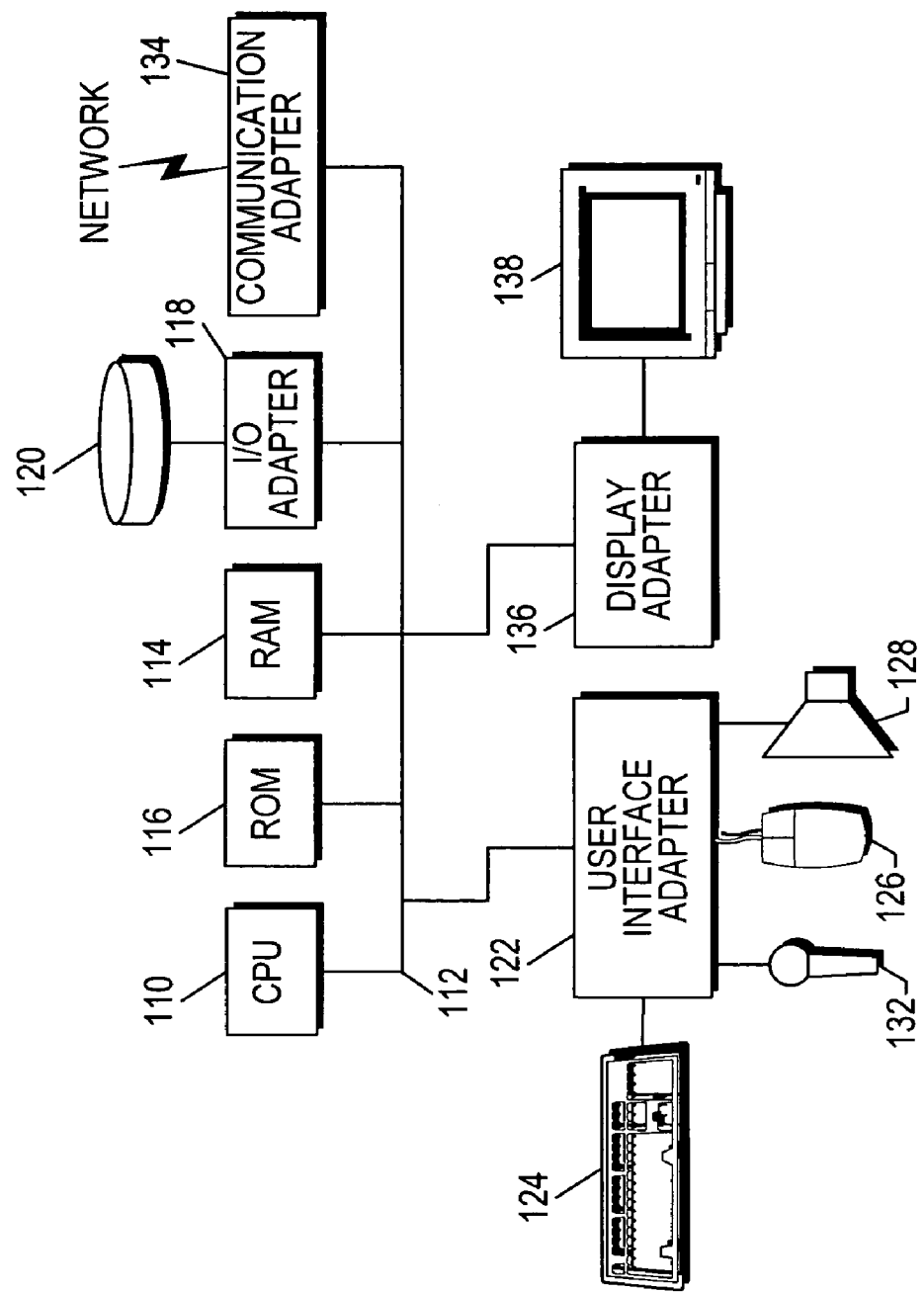
FIG. 1 is a schematic diagram of a hardware implementation of one embodiment of the present invention.

A preferred embodiment of a system in accordance with the present invention is preferably practiced in the context of a personal computer such as an IBM compatible personal computer, Apple Macintosh computer or UNIX based workstation. A representative hardware environment is depicted in FIG. 1, which illustrates a typical hardware configuration of a workstation in accordance with a preferred embodiment having a central processing unit 110, such as a microprocessor, and a number of other units interconnected via a system bus 112. The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network) and a display adapter 136 for connecting the bus 112 to a display device 138. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language-2.0" (November 1995); and R. Fielding, H, Frystyk, T. Berners-Lee, J. Gettys and J. C. Mogul, "Hypertext Transfer Protocol—HTTP/10.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;
Restricted user interface capabilities;
Can only produce static Web pages;
Lack of interoperability with existing applications and data; and
Inability to scale.

Sun Microsystem's Java language solves many of the client-side problems by:

Improving performance on the client side;
Enabling the creation of dynamic, real-time Web applications; and
Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Figure 2:
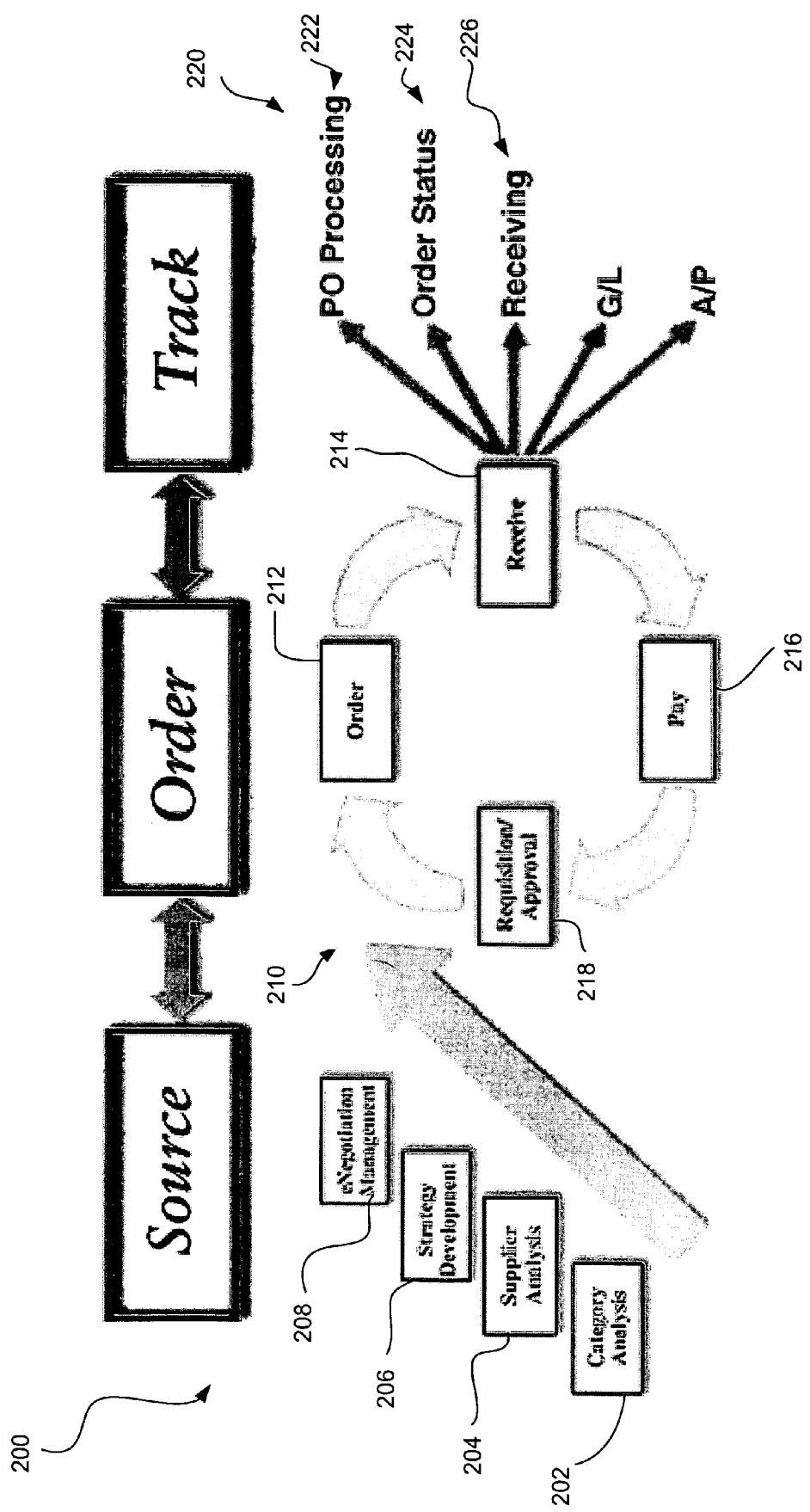
FIG. 2 is a process flow diagram of a procurement process in an electronic commerce setting in accordance with an embodiment of the present invention.

FIG. 2 is a process flow diagram of a procurement process in an electronic commerce setting in accordance with an embodiment of the present invention. The procurement process includes a four step sourcing management process 200. Such sourcing process enables the business (buyer) to create an effective strategy for purchasing direct or indirect materials, services, or capital goods. The four step sourcing process includes category analysis 202, supplier analysis 204, strategy development 206, and solution management 208. More detail about the sourcing process will be set forth below.

Upon performance of the sourcing process, a cyclic order process 210 is performed. An order is placed in operation 212 and received in operation 214. The order is paid for in operation 216. Requisition and approval are performed in operation 218. Any problems encountered during requisition and approval can result in a new order being placed. It should be kept in mind that these operations may be performed in any order.

The procurement process also includes a tracking process 220 for tracking orders. The tracking process includes tracking of post office processing 222, providing order status reports 224, receiving processes 226, etc.

Figure 3:
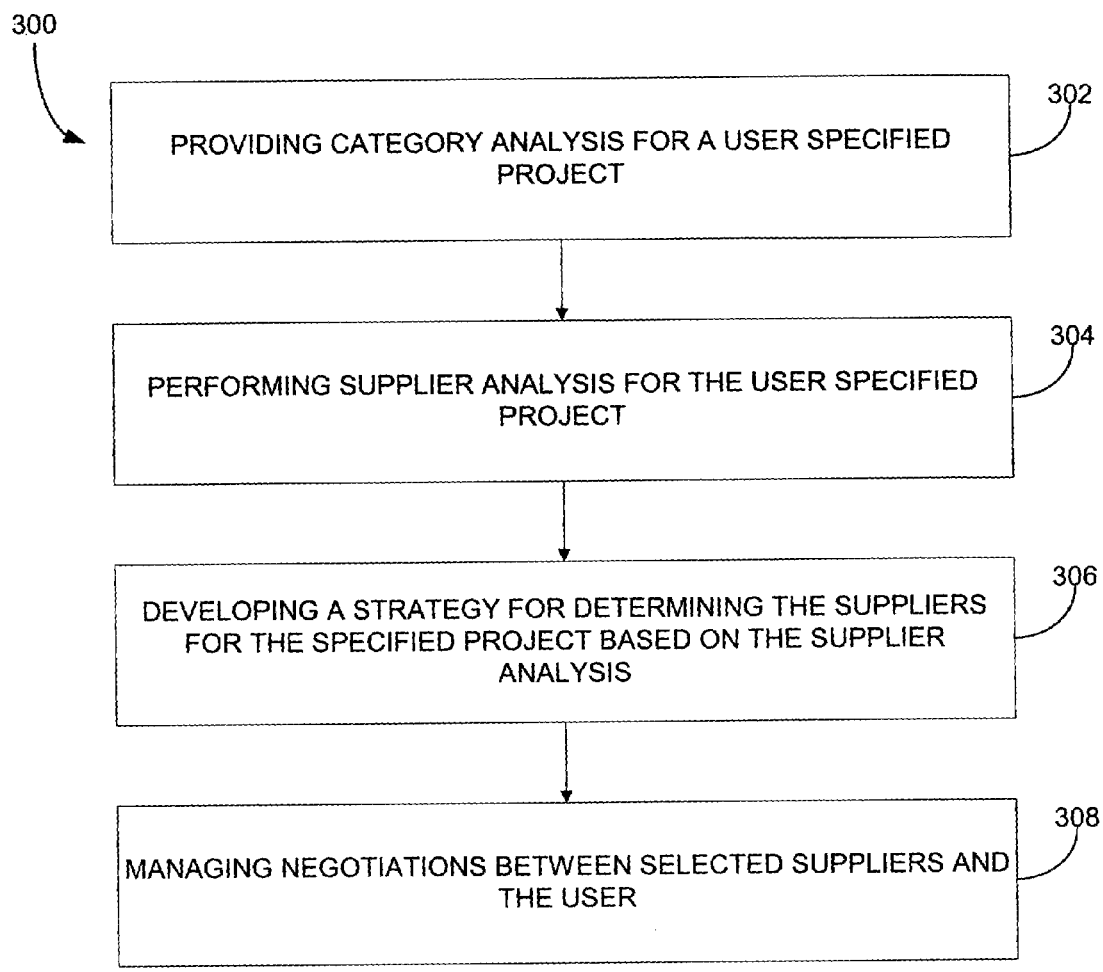
FIG. 3 is a flow chart that illustrates a process for affording a market management framework in accordance with an embodiment of the present invention.

FIG. 3 illustrates a process 300 for affording a market management framework in accordance with an embodiment of the present invention. In operation 302, category analysis is provided for a user specified project. In operation 304, supplier analysis is performed for the user specified project. A strategy is then developed in operation 306 for determining the suppliers for the specified project based on the supplier analysis. Further, in operation 308, negotiations are managed between selected suppliers and the user.

In one aspect of the present invention, providing category analysis includes identifying a file including expenditure data relating to spent monies, extracting the expenditure data from the file, determining an independent and a dependent variable relating to the expenditure data, graphing the expenditure data based on the determined variables, and displaying conclusions based on the expenditure data.

In another aspect of the present invention, performing supplier analysis includes providing access to a database including supplier profile data, identifying supply chain relationships based on particular commodities and the supplier profile data, generating a report depicting the identified supply chain relationships, allowing users to create request for information for specified suppliers based on the generated report, and distributing the created request for information to the specified suppliers.

In yet another aspect of the present invention, developing a strategy for determining the suppliers includes allowing a user to dynamically create a request for quote document, grouping specific request for quote line items based on a request from the user, enabling the user to attach further data to the request for quote document, and distributing the request for quote document to specific suppliers.

In a further aspect of the present invention, managing negotiations includes allowing a user to post an electronic request for quote on a website, affording selected suppliers access to the request for quote on the website, supporting electronic negotiations between the user and a selected supplier, and facilitating post-negotiation analysis via a decision matrix.

Figure 4:
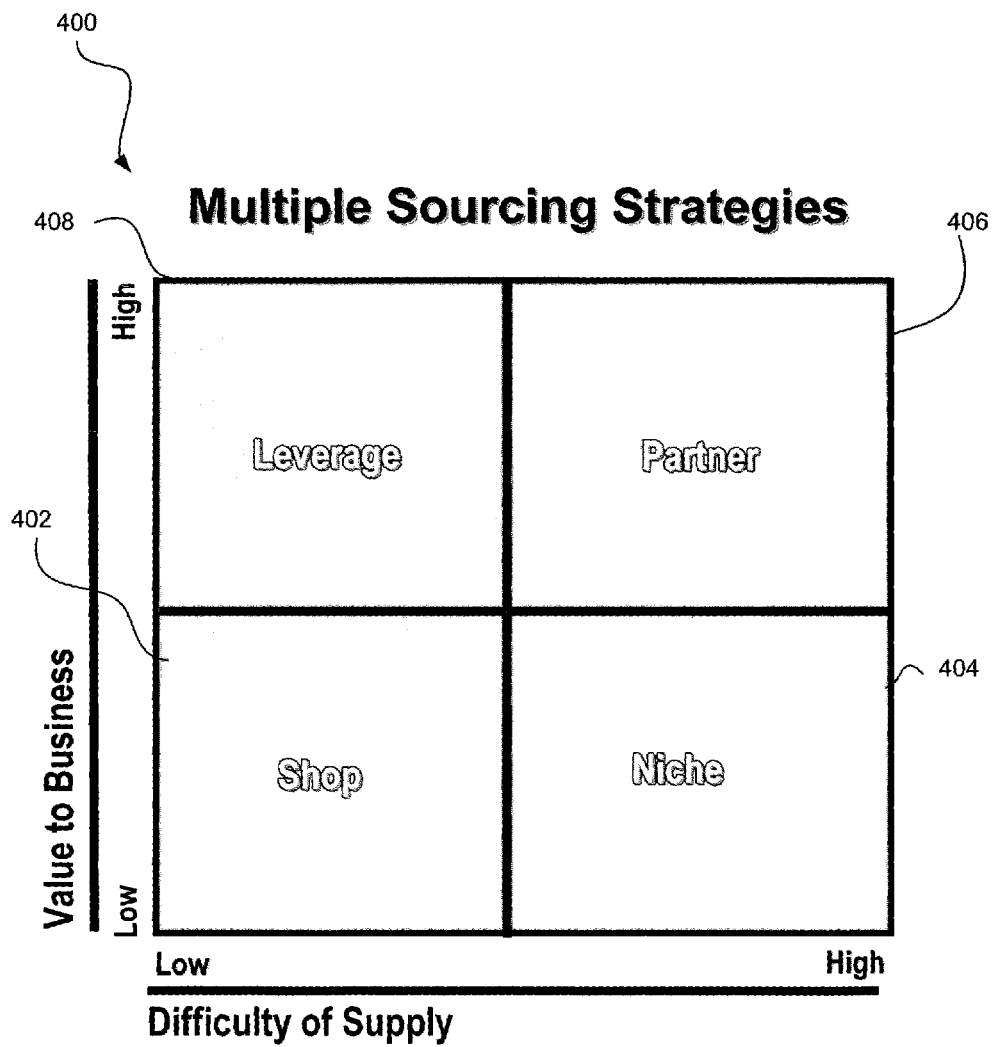
FIG. 4 illustrates a chart of several sourcing strategies.

FIG. 4 illustrates a chart 400 of several sourcing strategies, including shopping 402, finding a niche 404, partnering 406, and leveraging 408. An example of a shopping strategy includes acquiring the resources, products, etc. from a variety of supplying companies when needed. As shown by the chart, a shopping strategy has a low value to a business because the company may be forced to pay market value for the needed goods. However, a shopping strategy makes it easier to acquire a supply of resources, products, etc. because the business is not reliant on a single supplier to meet supply requirements.

Finding a niche has a low value to business and a high difficulty of supply. Limiting the business to a particular niche severely hinders the expandability of the business into new markets. Further, specialized products may not be readily available, or may have a high market value.

Partnering with a supplier has a high value to the business, because the business is able to negotiate a lower price for goods supplied by the partner supplier. However, partnering makes acquiring the goods more difficult in that the business is reliant upon the supplier for delivering the goods.

A leveraging approach has a high value to the business, and a low difficulty of supply. For example, the business can partner with a supplier to receive goods at a reduced price, and can shop for goods that are not forthcoming or that are not supplied by the partner.

Figure 5:
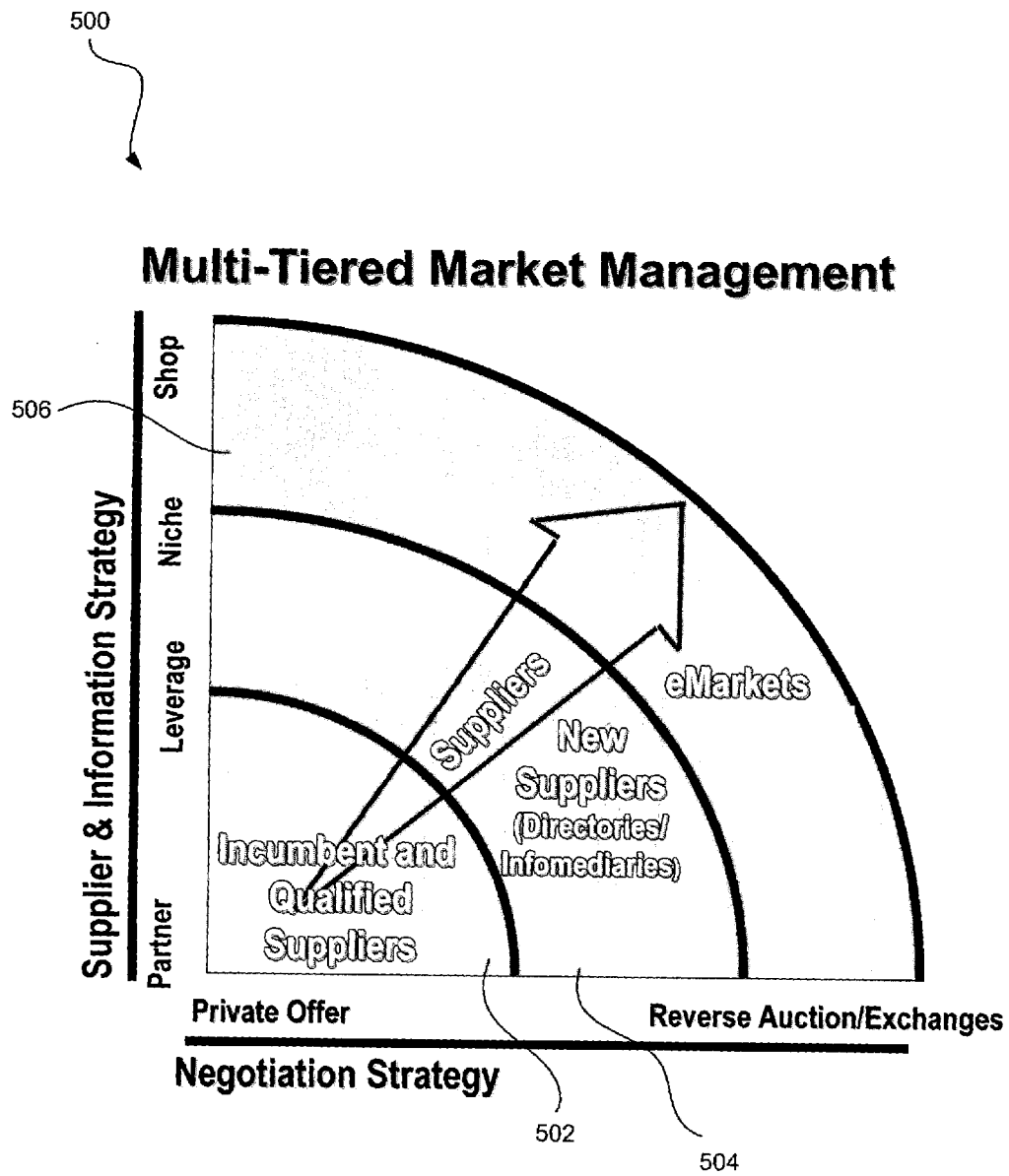
FIG. 5 depicts a multi-tiered sourcing management process in accordance with an embodiment of the present invention.

FIG. 5 depicts a multi-tiered sourcing management process 500 in accordance with an embodiment of the present invention. According to this process, supplier and information strategy is balanced with a negotiation strategy to allow a business to create a reliable supply chain while minimizing costs, leading to maximized profits and customer satisfaction. Incumbent and qualified suppliers 502 are negotiated with privately and may even be made a partner with the business.

The business is able to leverage its supply between the incumbent and qualified suppliers and new suppliers 504 by private negotiation as well as advertising and sometimes reverse auctions and exchanges. Supply of niche products can be obtained from new suppliers and obtained on the Internet from emarkets 506. Private offers can be made to the new suppliers while reverse auctions and exchanges can be used to obtain the niche products from emarkets. Additionally, the business can shop for goods using the emarkets.

Figure 6:
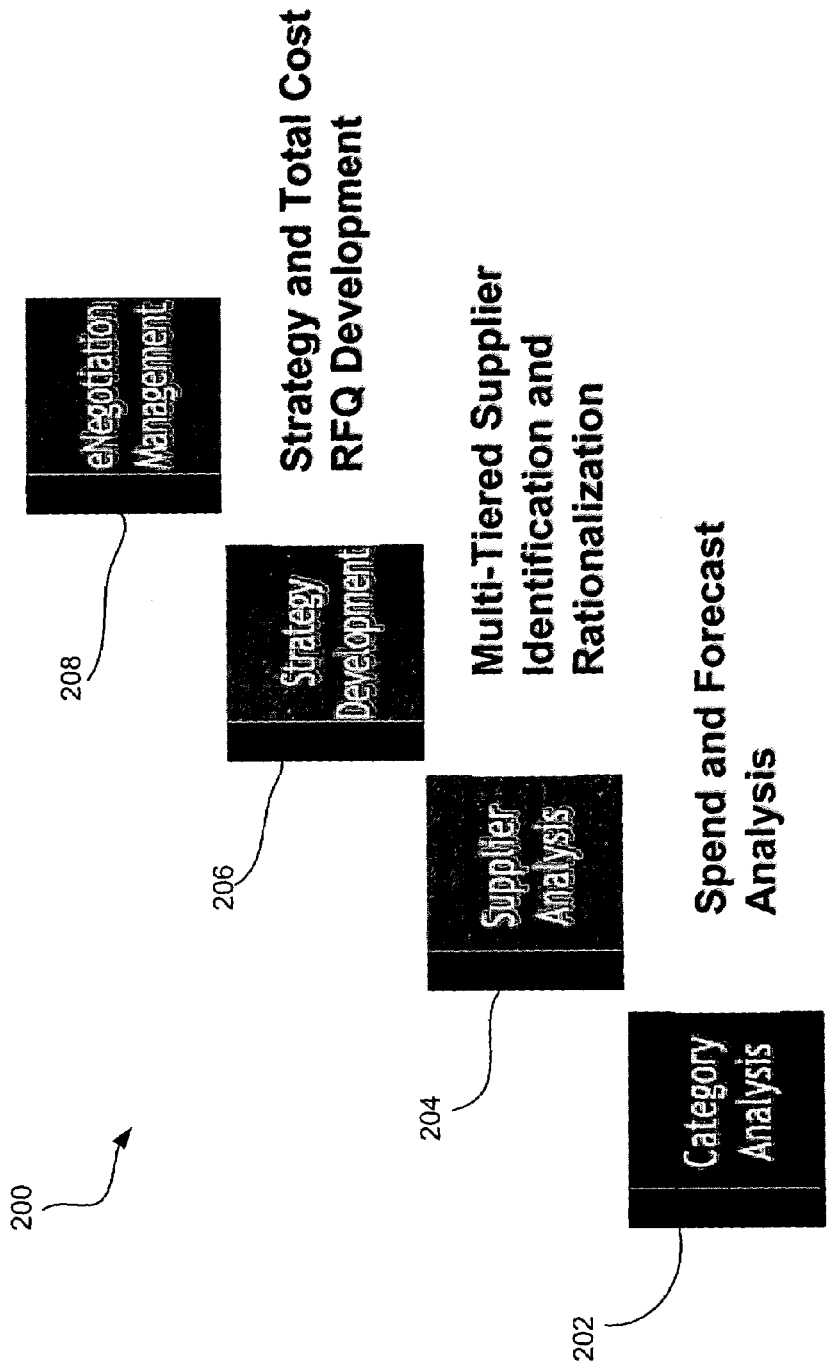
FIG. 6 depicts a sourcing process for multi-tiered market management in accordance with one embodiment of the present invention.

FIG. 6 depicts a sourcing process (see also FIG. 2) for multi-tiered market management in accordance with one embodiment of the present invention. A category analysis is performed to determine what goods are required to meet current and/or future business demands. The category analysis allows users to leverage analytical tools to integrate internal spend and usage data with external market research, to attain a full understanding of commodity specific economics and trends.

When performing the category analysis, spending and usage data is retrieved from a data warehouse of the business. The business also uses market intelligence to check directories and infomediaries for new suppliers. A forecast of goods requirements is performed. Further, a spending and cost analysis is performed.

Supplier analysis assists a buyer to identify potential supply sources and enables collaboration with suppliers to help assess supplier capabilities to deliver "total cost" savings. During supplier analysis, suppliers at various tiers (see FIG. 5) are identified and an analysis of each supplier is performed to determine which supplier can provide the desired goods and at what price. Also, capabilities of the suppliers to meet requirements and adapt to changing requirements are analyzed. A reliability of the supplier can also be analyzed. The process of FIG. 4 can be used in this analysis.

Strategy development enables a buyer to determine total system cost components and decision criteria to select a supplier or suppliers. Strategy development will determine the strategic alignment between potential suppliers and the buyer, and the terms of the contract. A strategy for obtaining goods at the lowest price is developed during strategy development. A total cost analysis can also be performed, as discussed below with reference to FIG. 7.

In negotiations management, techniques for the negotiations for goods are developed and analyzed. Here, buyers have visibility and control over all aspects of negotiation events, including scheduling, bidding, analysis, and award.

Figure 7:
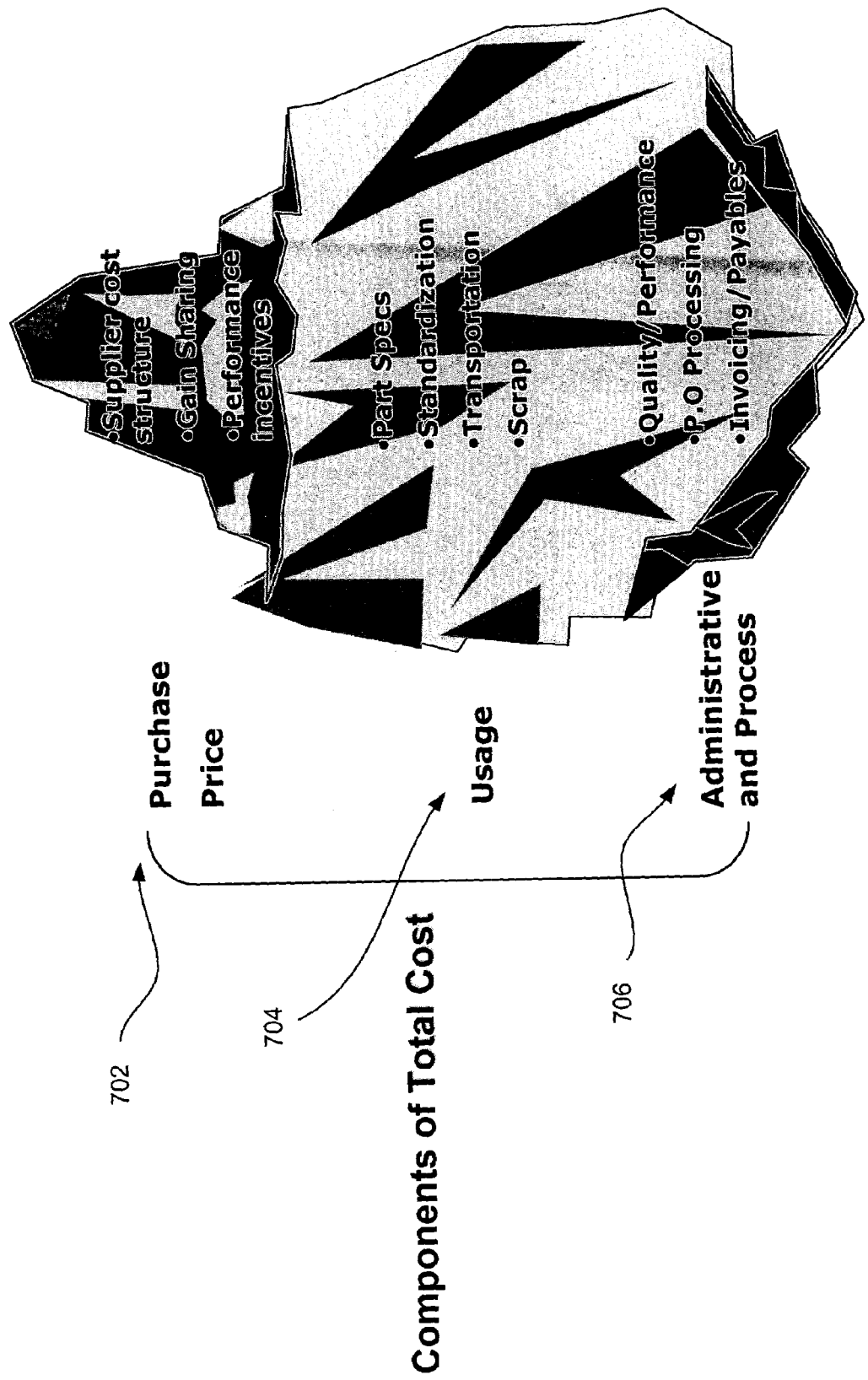
FIG. 7 shows several components of a total cost analysis for private offer and reverse auctions.

FIG. 7 shows several components of a total cost analysis for private offer and reverse auctions. One element is purchase price 702. The purchase price is determined based on a supplier cost structure, gain share, and performance incentives.

Another element is usage 704. Usage data includes part specifications, the cost of standardization, transportation costs, and scrap costs. Yet another element is administrative and processing costs 706. This element includes quality and performance data, post office processing costs, the costs of invoicing, and the costs of processing payables.

Accordingly, portions of the embodiments of the present invention set forth above with respect to FIGS. 2-7 can be combined to create a Strategic eSourcing Management solution/system (SSM). Customized user interfaces (described below) can be utilized to leverage the emerging Internet economy. The capability to create a strategic procurement organization is enhanced. Savings capture is accelerated. Further, resource requirements for information technology are low. The result is a sustainable capability to achieve the lowest total cost of ownership.

Figure 8:
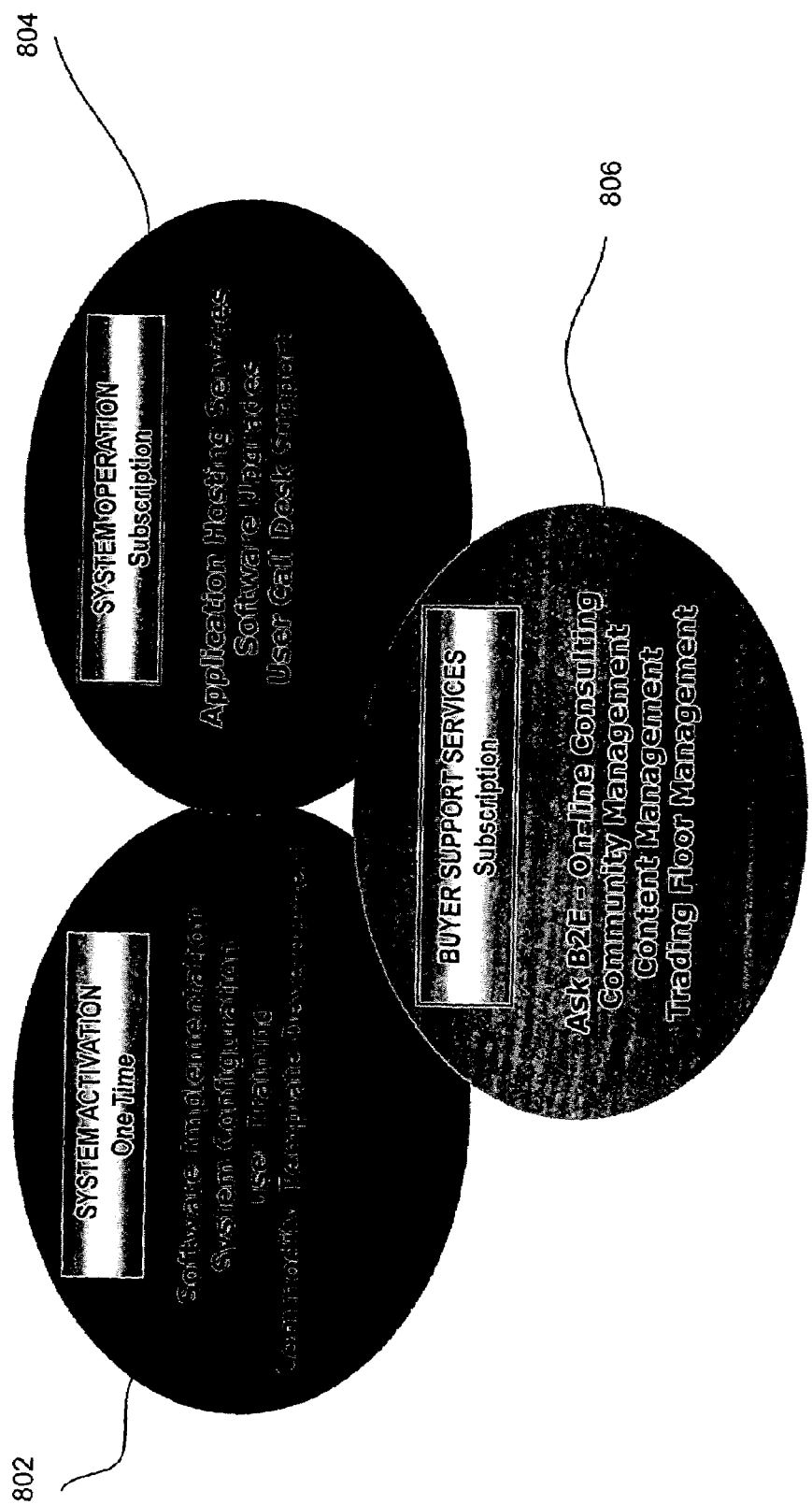
FIG. 8 depicts an illustrative embodiment of an SSM.

One embodiment of the SSM creates a subscription-based solution that seamlessly blends enabling services, performance support, and application tools. As shown in FIG. 8, this illustrative embodiment includes three components: system activation 802, system operation 804, and buyer support services 806. System activation takes place one time. During system activation, enabling software is implemented. This software includes accounting software, tracking software, Internet software and/or user interface software. The system of the business is configured for the new capabilities enabled by SSM. Users and employees are trained and commodity templates are developed.

Once the system is activated, the system begins to operate. Services to maintain the system can be offered on a subscription basis. Such services can include application hosting services, such as web site hosting. Software upgrades can also be made available. Further, technical support can be offered.

Support services are also offered. Such support services may include on-line consulting services, trading community management, content management and trading floor management.

Figure 9:
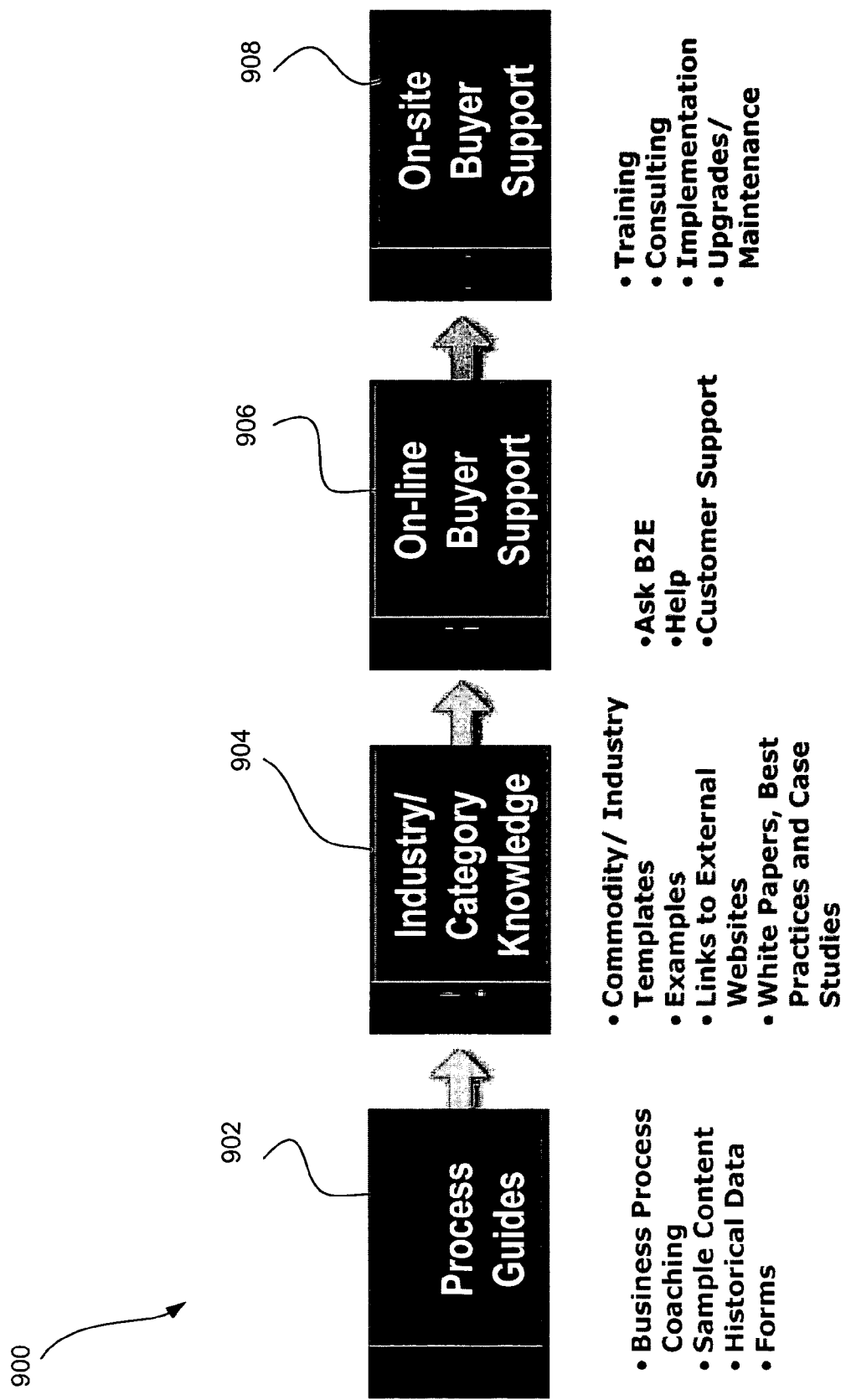
FIG. 9 depicts elements of a buyer support system that may be utilized to offer the support services described with reference to FIG. 8.

FIG. 9 depicts elements of a buyer support system 900 that may be utilized to offer the support services described above with reference to FIG. 8. One element includes process guides 902. The process guides include business process coaching, sample content, historical data, and downloadable forms. Another element is industry and category knowledge 904. This element includes commodity and industry templates, examples, links to external websites, white papers, recommendations of best practices, and case studies. An on-line buyer support element 906 is also offered, which includes online customer help and support. Another element is on-site buyer support. Such support services include training, consulting, and implementation services. Upgrades and maintenance 908 are also provided.

Figure 10:
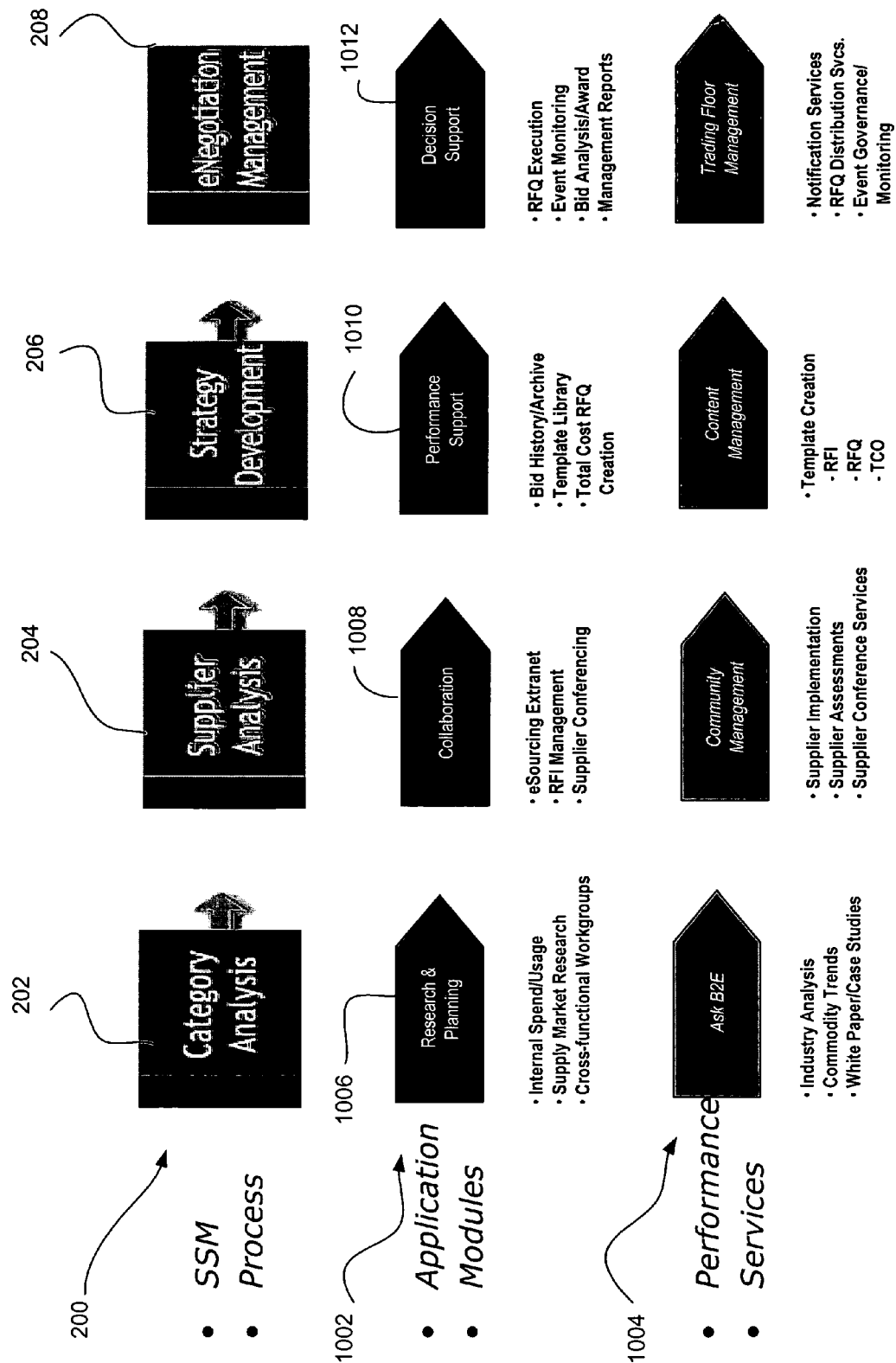
FIG. 10 illustrates the total cost analysis process in operation with an SSM process with corresponding application modules and performance services.

FIG. 10 illustrates the total cost analysis process in operation with an SSM process with corresponding application modules 1002 and performance services 1004. A research and planning module 1006 is utilized for category analysis. This module analyzes internal spending and usage. It also performs supply market research. Some of the performance services associated with category analysis and preferably offered by subscription to a business implement SSM include industry analysis, commodity trends, and case studies.

A collaboration module 1008 is utilized during supplier analysis. The collaboration module provides an eSourcing extranet, RFI management, and supplier conferencing. Performance services that can be offered during supplier analysis include community management services. The community management services may include supplier implementation services, supplier assessments, and supplier conferencing services.

During strategy development, a performance support module 1010 provides bid history reporting and archiving, a template library, and total cost creation. Content management services can be offered, such as template creation.

A decision support module 1012 is utilized during eNegotiation management. The decision support module provides event monitoring, analyzes awards and bids, and creates management reports. Trading floor management services can be offered, including notification services, distribution services, and event governance and monitoring.

Figure 11:
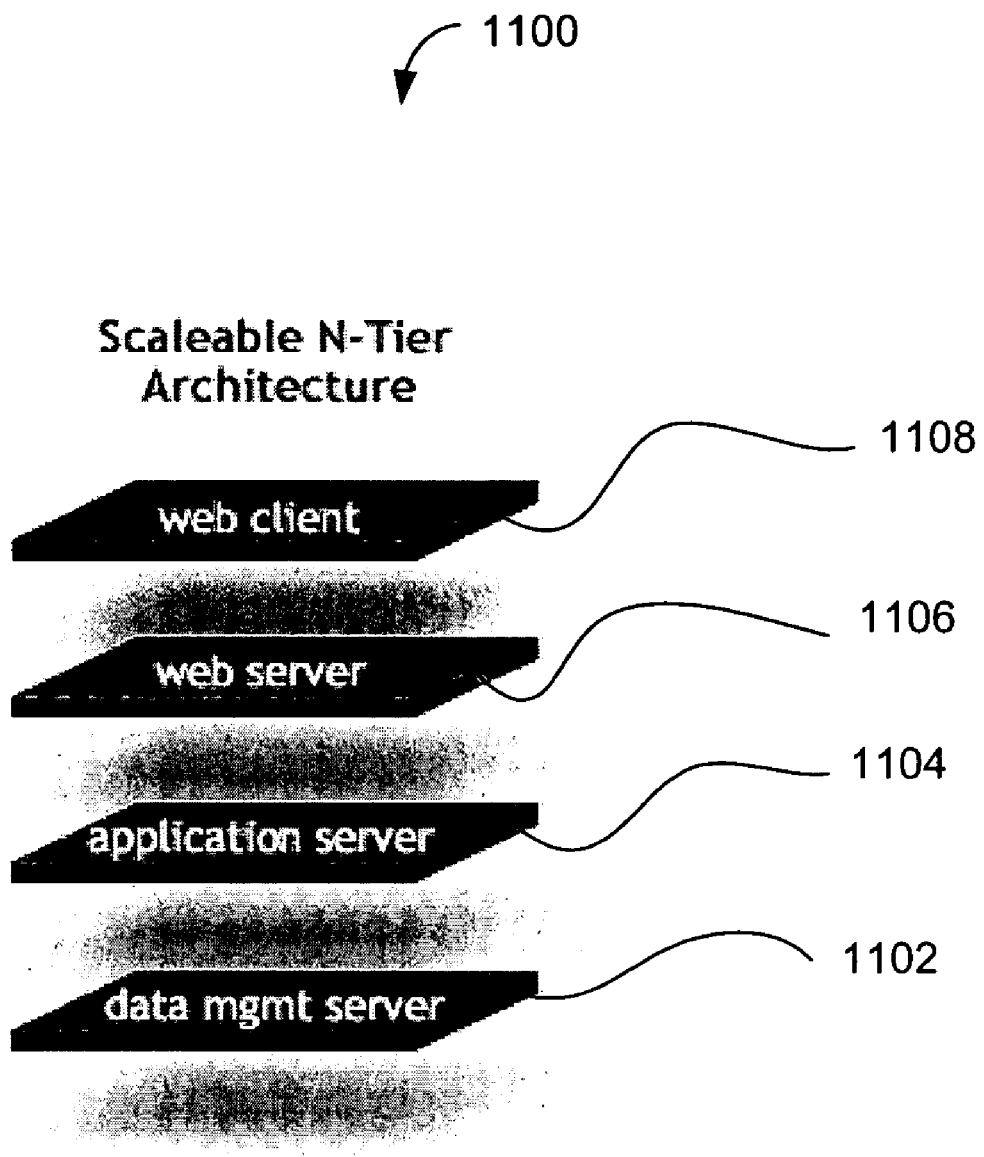
FIG. 11 depicts an architecture of the SSM in accordance with a preferred embodiment.

FIG. 11 depicts an architecture 1100 of the SSM in accordance with a preferred embodiment. The architecture is a scalable web-based application for strategic sourcing and provides reliability, scalability, usability, and flexible access. One tier includes a data management server 1102 that can be used to store accounting data, inventories, shipping management, etc. Another tier includes an application server 1104. A web server 1106 forms part of another tier, while a web client 1108 forms part of yet another tier.

Figure 12:
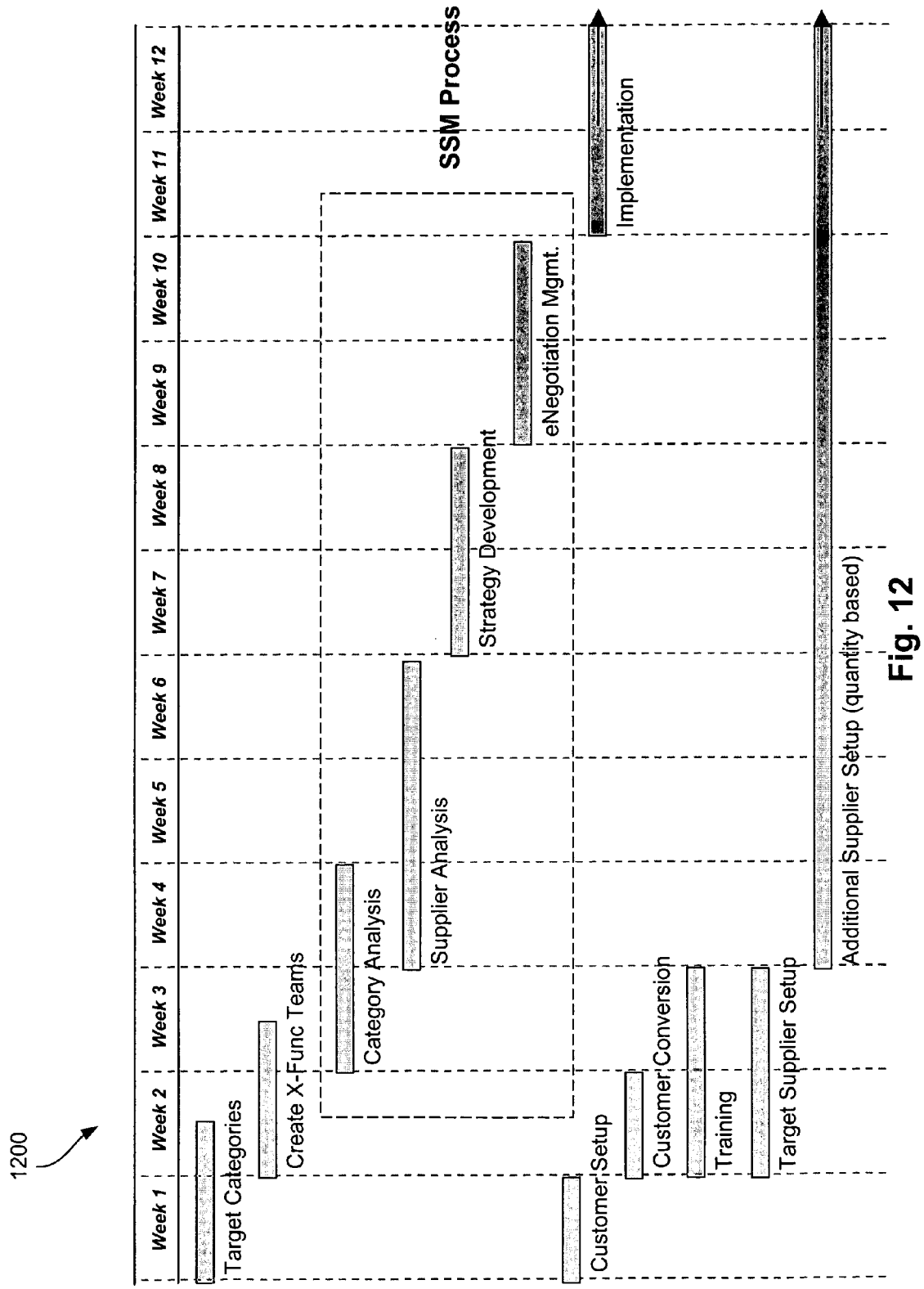
FIG. 12 depicts an illustrative timeline for implementation of an SSM system.

FIG. 12 depicts an illustrative timeline 1200 for implementation of an SSM system. As shown, the target categories are selected in the first two weeks. Meanwhile, implementing software is set up on the business's system. Functional teams are created in the second and third weeks. Also during the second week, conversion of the business's system and operating procedures to be compliant with the SSM system and solution is performed. Training of the business's employees on how to utilize the SSM system and methodology takes place in the second and third weeks, as does target supplier setup. Any additional supplier setup begins in week 4. This, of course, will depend upon a quantity of goods to be supplied.

The eSourcing management process begins in the third week beginning with category analysis, which is performed during the third and fourth weeks. Supplier analysis begins in week four, while strategy development begins in the seventh week, preferably upon conclusion of the supplier analysis. eNegotiation management begins in week nine, preferably after a sourcing strategy is developed Implementation of the eSourcing strategy takes place beginning in week eleven. It should be kept in mind that the timeline of FIG. 12 is for illustrative purposes only, as the time to perform the various steps may vary from business to business.

Figure 13:
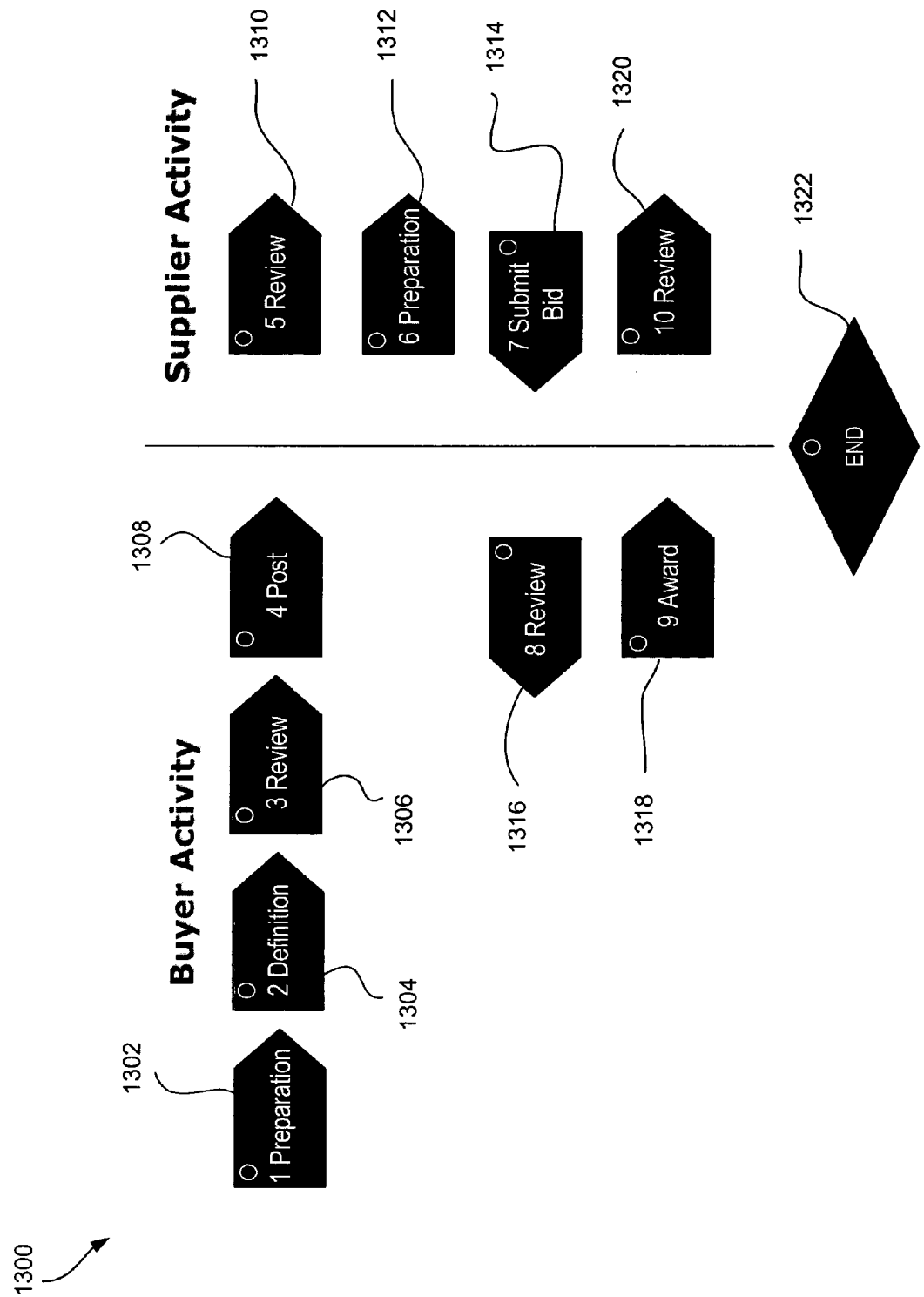
FIG. 13 depicts a process flow of the SSM in accordance with a preferred embodiment of the present invention.

FIG. 13 depicts a process flow 1300 of the SSM in accordance with a preferred embodiment of the present invention. In operation 1302, the buyer prepares to purchase goods from a supplier. The goods desired are defined in operation 1304 and reviewed in operation 1306. A request for goods is posted in operation 1308, preferably including a desired price. In operation 1310, the supplier reviews the request and, in operation 1312, prepares to submit a bid. The supplier submits a bid in operation 1314, upon which the buyer reviews the bid in operation 1316. If the bid is acceptable, the buyer awards a purchase contract to the buyer in operation 1318. In operation 1320, the supplier reviews the offer. If the bid or the offer for purchase is unacceptable, negotiations occur until the parties agree to a price. The process ends at 1322.

Figure 14:
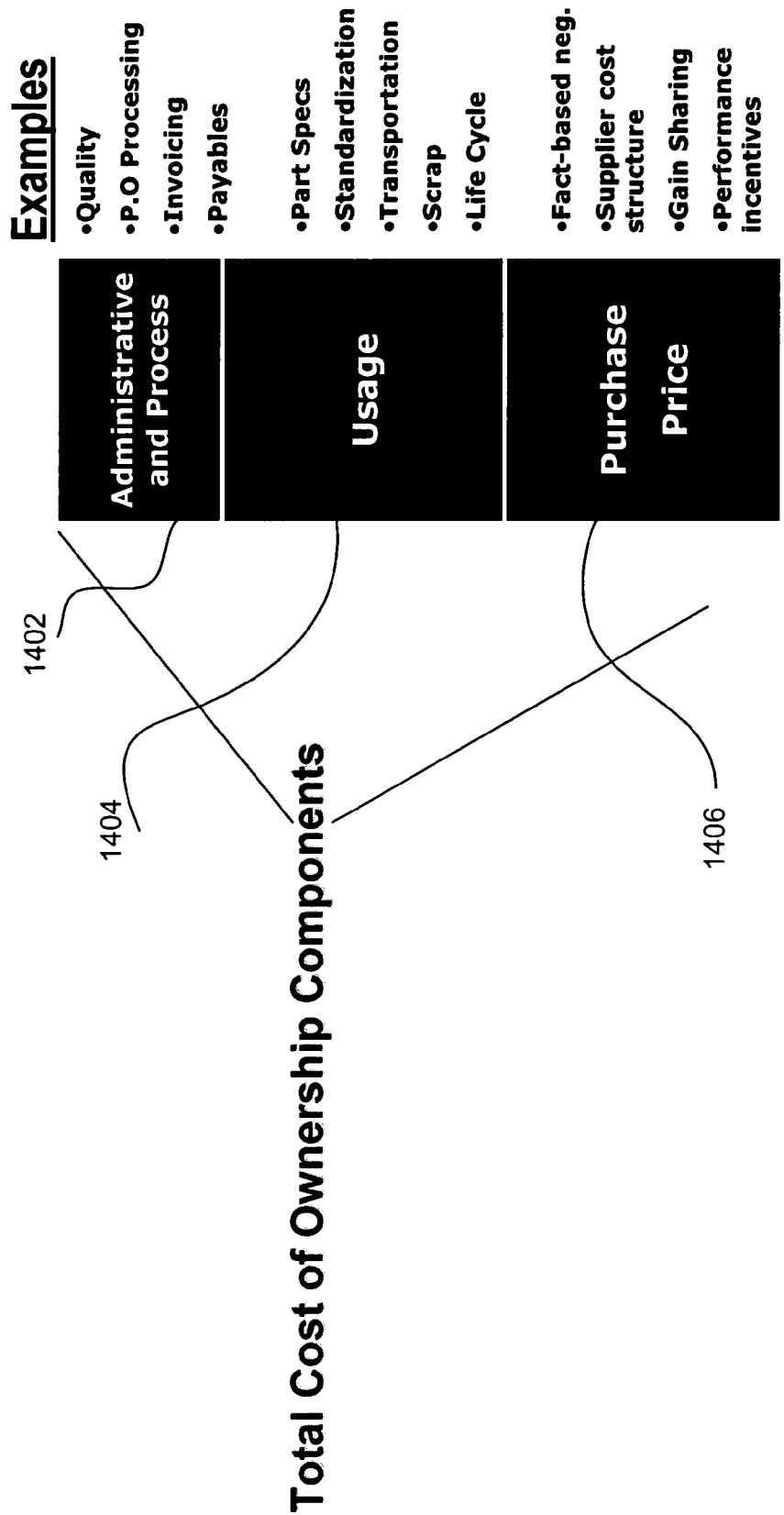
FIG. 14 illustrates several total cost of ownership components, which a company can manipulate to achieve lower total cost through strategic eSourcing utilizing an SSM system and process.

FIG. 14 illustrates several total cost of ownership components, which a company can manipulate to achieve lower total cost through strategic eSourcing utilizing the SSM system and process. The administrative and process component 1402 includes quality assurance, post office processing, invoicing and payables. The usage component 1404 includes part specifications, standardization, transportation, scrap, and life cycle. The purchase price element 1406 includes supplier cost structure, gain sharing, and performance incentives.

Figure 15:
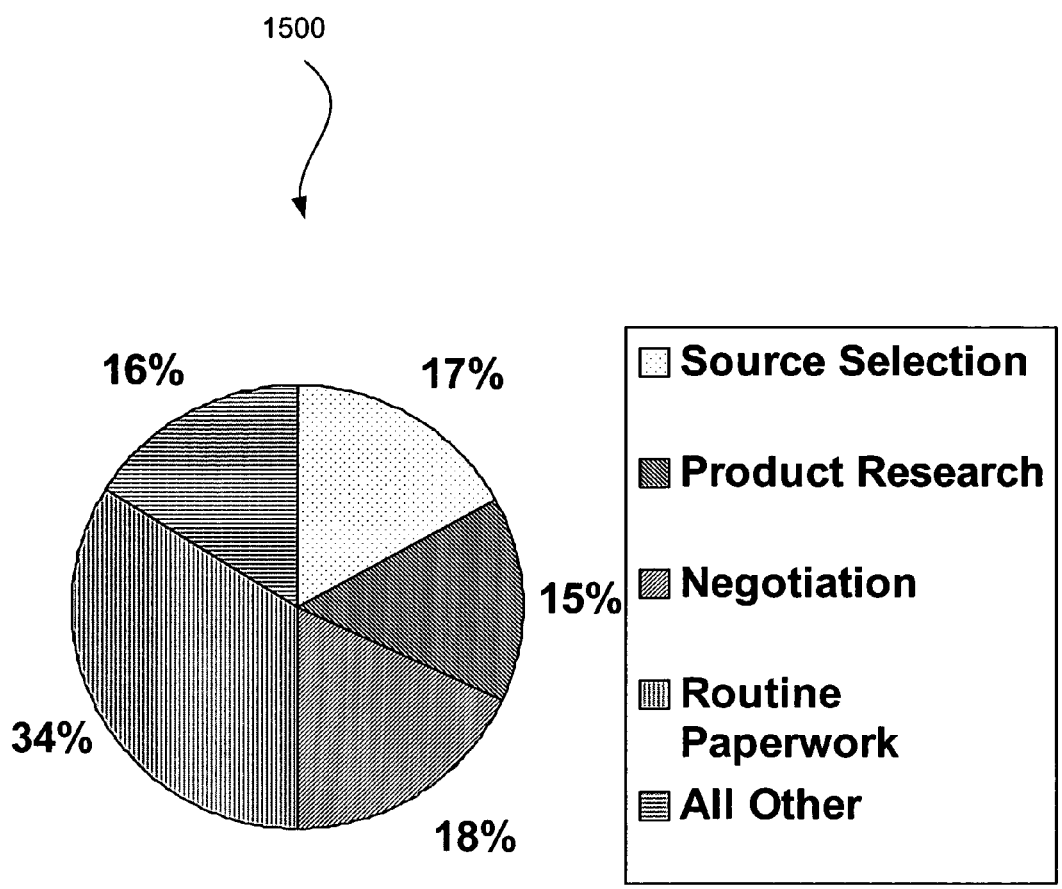
FIG. 15 depicts a chart showing an illustrative allocation scheme for purchasing professional time.

FIG. 15 depicts a chart 1500 showing an illustrative allocation scheme for purchasing professional time. Preferably, the about half of the professional time purchased is focused on sourcing. Here, as shown in the chart, source selection, product research, and negotiation comprise about half of the professional time.

Figure 16:
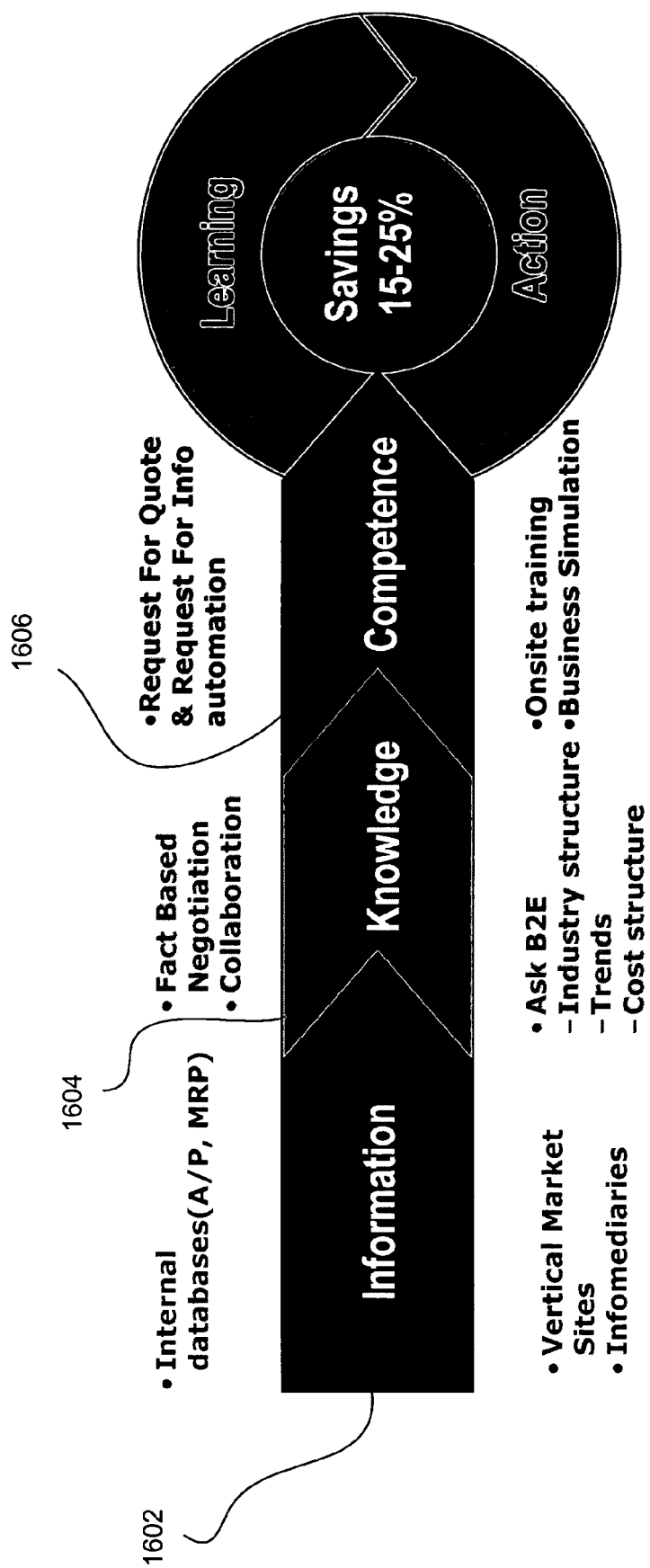
FIG. 16 illustrates a progression for building internal eSourcing capabilities.

FIG. 16 illustrates a progression for building internal eSourcing capabilities. Information 1602 is gathered. Information may be gathered from sources such as internal databases, market sites, and infomediaries. The information is used to create knowledge 1604. The knowledge created can be utilized for fact based negotiation and collaboration. Knowledge leads to competence 1606. The competence is used for learning and taking action, leading to lowered costs.

Figure 17:
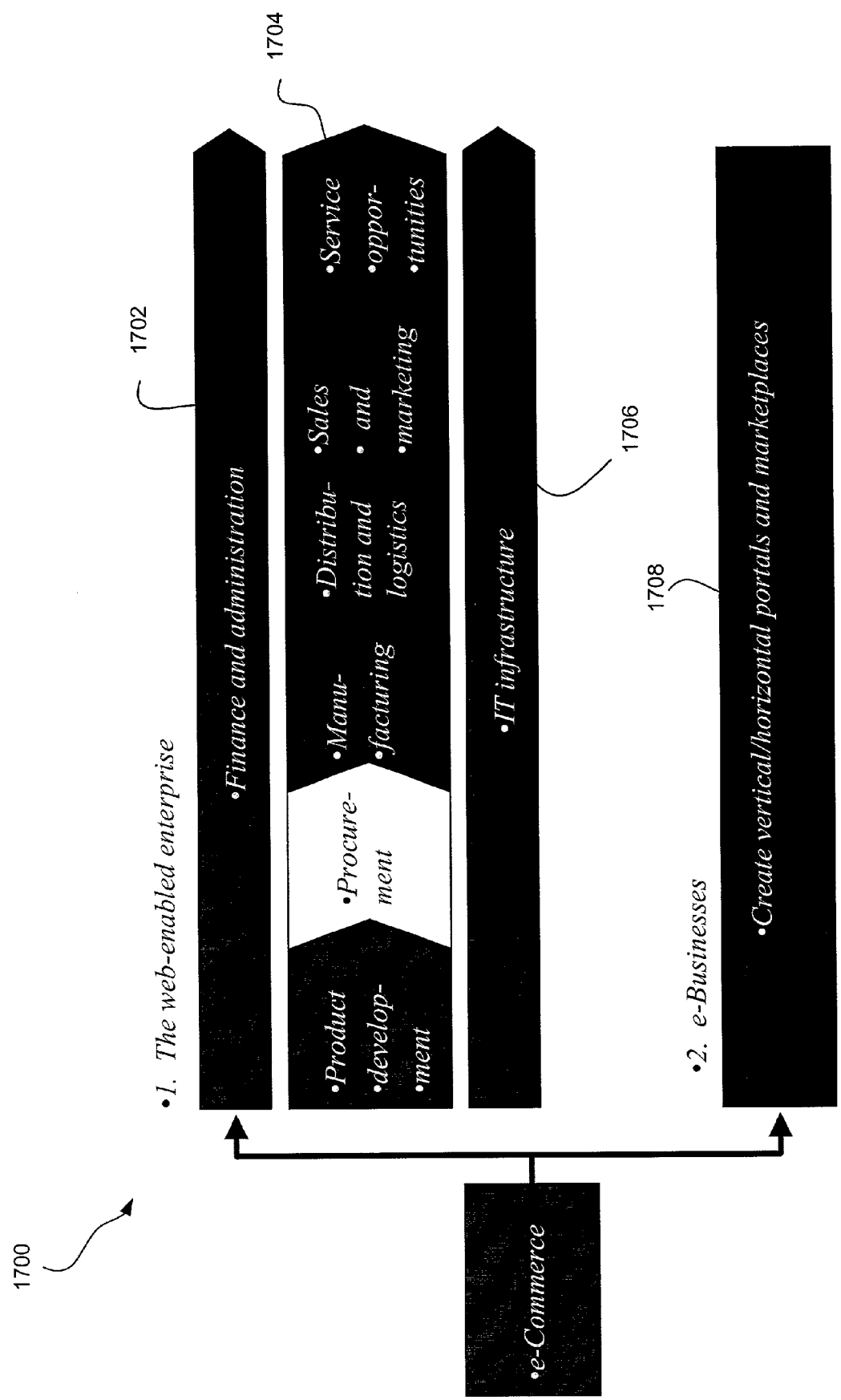
FIG. 17 is a depiction of the main elements of a business to business eCommerce architecture in accordance with one embodiment of the present invention.

The reasons more buyers are going online to obtain supplies include:

Lower prices
   Ability to analyze spend
   Ability to comparison shop
   Volume discounts through spend consolidation
   On-line bidding dynamics
   Accelerate savings Improve and sustain compliance
   Monitor and control spending
      Better supplier qualification and management processes reduce transaction costs
   Go paperless
   Freeing buyer's time FIG. 17 is a depiction of the main elements of a business to business eCommerce architecture 1700 in accordance with one embodiment of the present invention. A web enabled enterprise structure includes a finance and administration component 1702, a product sales infrastructure 1704, and an Internet technology infrastructure 1706. The second element of the business to business eCommerce architecture is an eBusiness infrastructure 1708. The infrastructure is used to create vertical and horizontal sales portals and marketplaces.

Figure 18:
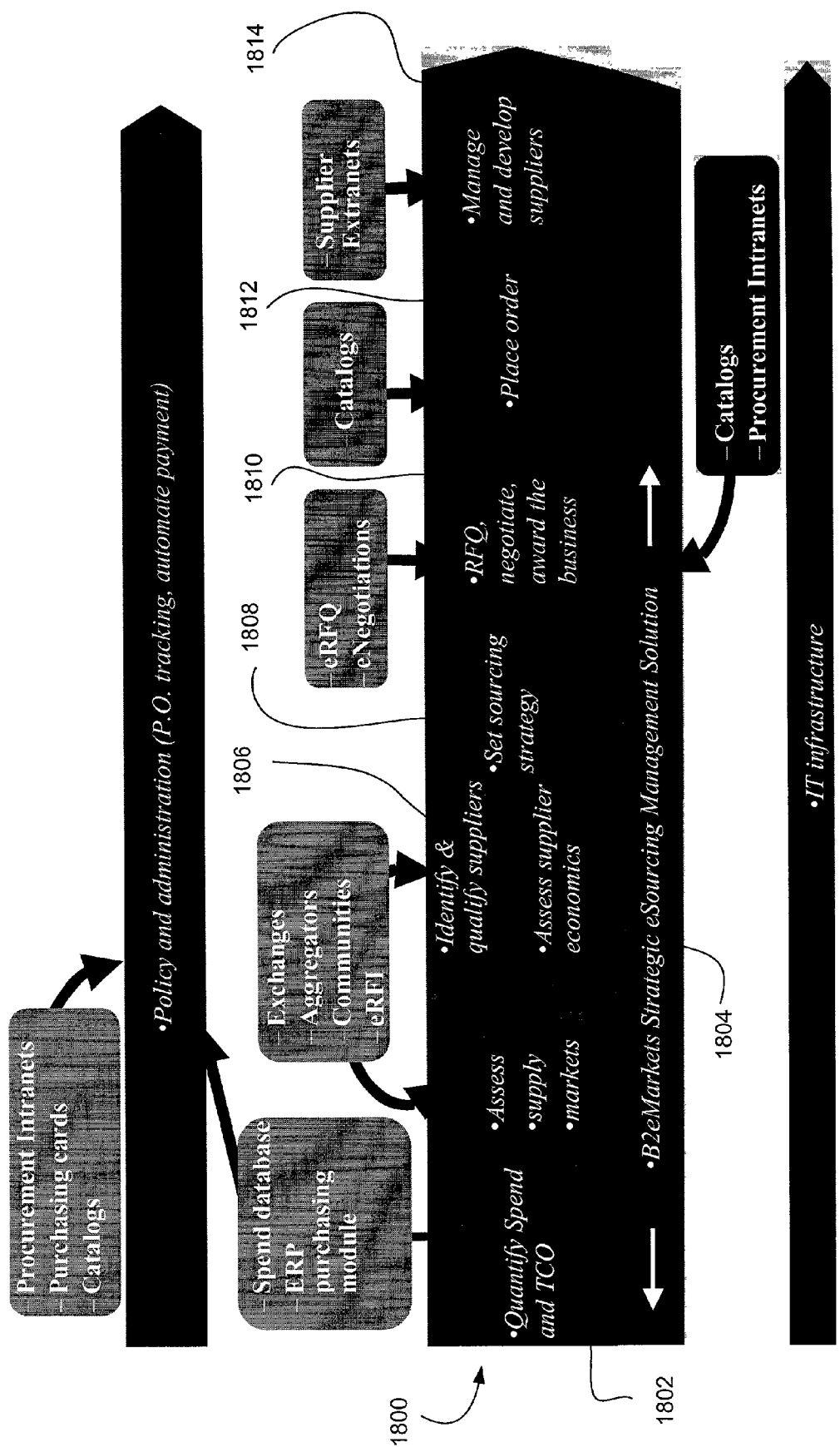
FIG. 18 illustrates an SSM process in accordance with another embodiment of the present invention.

FIG. 18 illustrates an SSM process 1800 in accordance with another embodiment of the present invention. Spending is quantified in operation 1802. Spending data can be obtained form a spending database and a purchasing module. In operation 1804, supply markets are assessed. Suppliers are identified and quantified in operation 1806. Supplier economics are also assessed in operation 1806. In operation 1808, a sourcing strategy is set. In operation 1810, negotiations take place and a contract for purchase is awarded. An order is placed in operation 1812, and suppliers are managed and developed in operation 1814.

Figure 19:
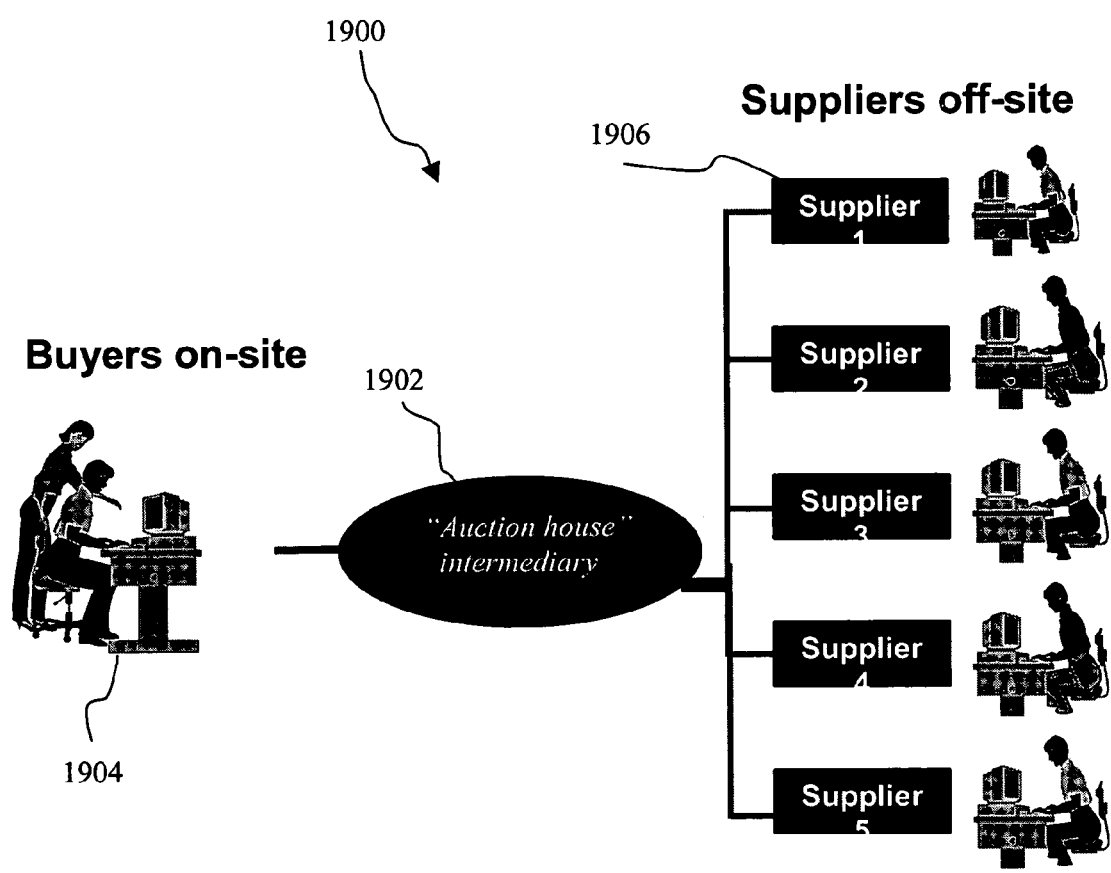
FIG. 19 illustrates a reverse auctioning system in accordance with an embodiment of the present invention.
Figure 20:
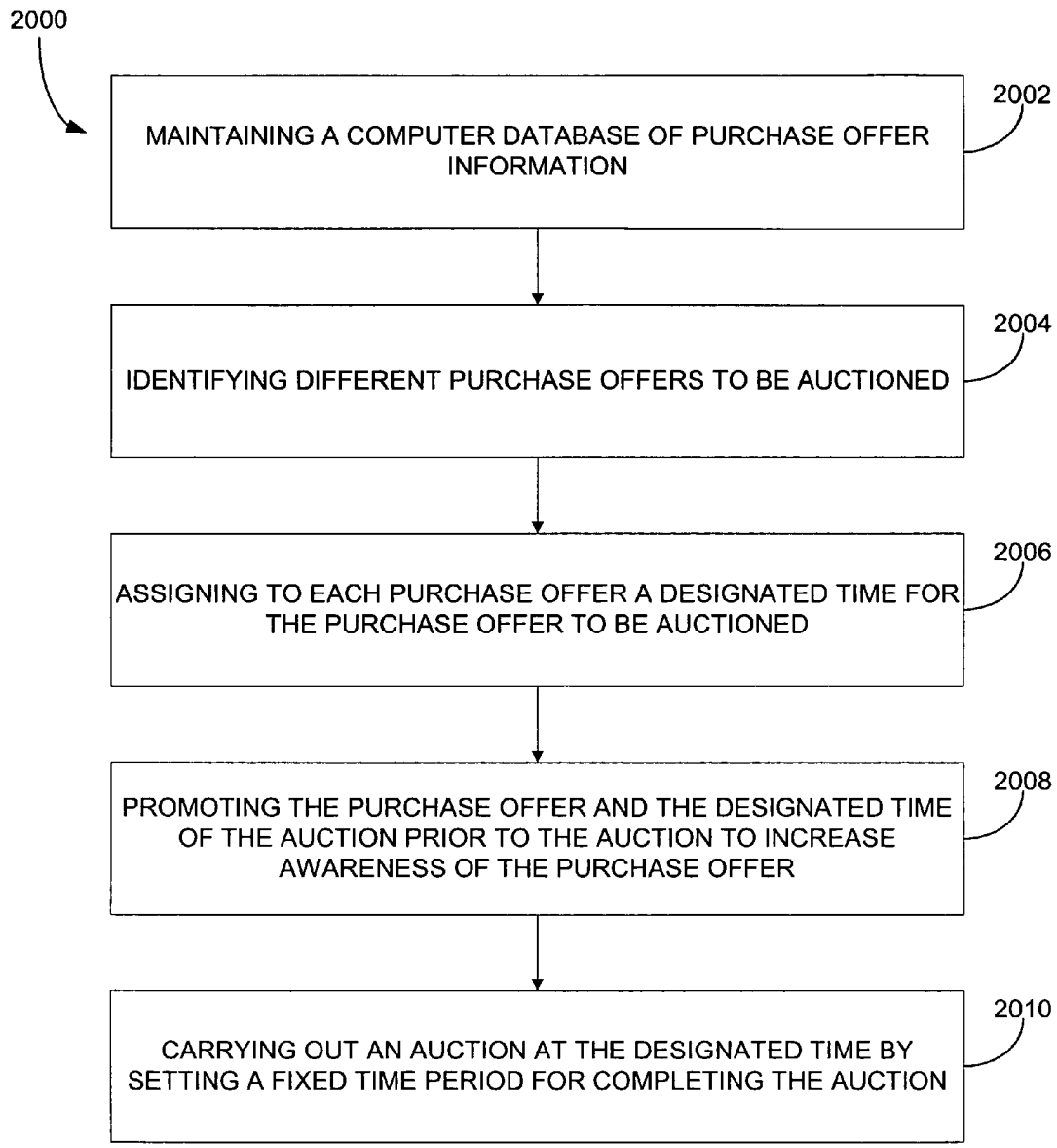
FIG. 20 depicts a flowchart of a method for a reverse auction in accordance with an embodiment of the present invention.

FIG. 19 illustrates a reverse auctioning system 1900 in accordance with an embodiment of the present invention. An auction house 1902 hosts an online reverse auction. An on-site buyer 1904 participates, as do several off-site suppliers 1906. Efficiencies created by electronic bidding include real-time competitive bidding between supplier participants in competitive bidding events
   Lower prices, driven by open market competition
   Low cost, computer-driven sales and purchasing FIG. 20 depicts a flowchart of a method 2000 for a reverse auction in accordance with an optional embodiment of the present invention. In operation 2002 a computer database of purchase offer information is maintained. The different purchase offers to be auctioned are identified in operation 2004, and in operation 2006 a designated time for the purchase offer to be auctioned is assigned to each purchase offer. The purchase offer and the designated time of the auction are promoted in operation 2008 prior to the auction to increase awareness of the purchase offer. In operation 2010, an auction is carried out at the designated time by setting a fixed time period for completing the auction.

Figure 21:
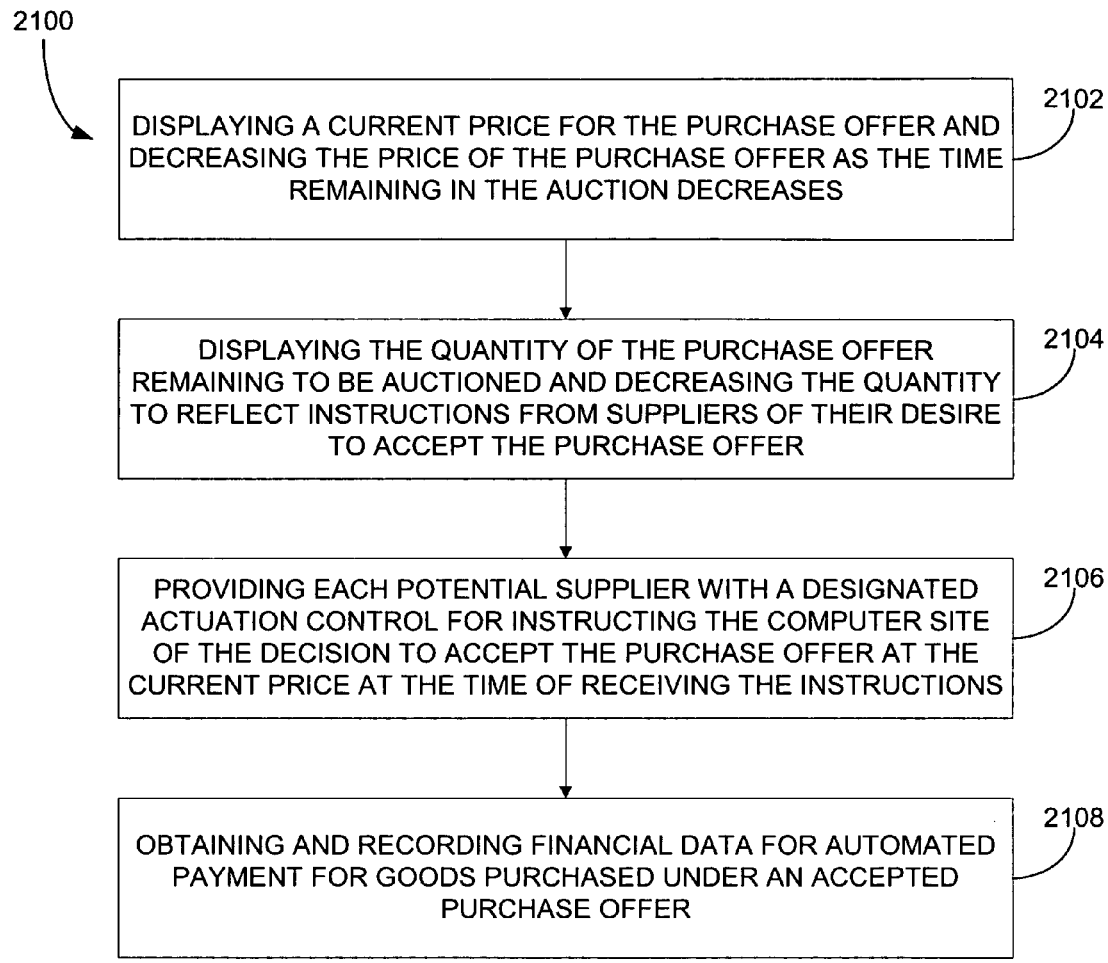
FIG. 21 depicts a process for carrying out the auction of operation 2010 of FIG. 20.

FIG. 21 depicts a process 2100 for carrying out the auction of operation 2010 of FIG. 20. In operation 2102, a current price for the purchase offer is displayed and the price of the purchase offer is decreased as the time remaining in the auction decreases. The purchase offer is preferably divisible to allow several suppliers to accept portions of the offer and supply only the quantity or type of goods or services pertinent to that portion. In operation 2104, the quantity of the purchase offer remaining to be auctioned is displayed and the desired quantity of goods sought to be purchased is decreased to reflect, during the auction process, instructions from suppliers of their desire to accept the purchase offer as the instructions are received thereby providing dynamic feedback to potential suppliers during the auction. In operation 2106, each potential supplier is provided with a designated actuation control for instructing the computer site of the decision to accept the purchase offer at the current price at the time of receiving the instructions. In operation 2108, financial data is obtained and recorded for automated payment for goods purchased under an accepted purchase offer.

In a variation, the process of FIG. 21 includes removing each supplier from the auction process upon providing instructions to accept the purchase offer at the displayed current price at the time the instructions were received. In this way the supplier is not exposed to further decreases in the price of the purchase offer, and is removed from that particular auction process.

In another variation, the process of FIG. 21 includes registration of the supplier or potential suppliers which can take place as part of a pre-registration process. The registration process can occur on-line or can be carried out off-line.

According to a further variation of the invention, the process of FIG. 21 includes connecting the computer site directly to separate and distinct financial institutes for real time confirmation of acceptable financial transaction of the purchase price of goods under an accepted purchase offer. In this way, automated payment confirmation is carried out.

A computer site for reverse auctioning for purchase of goods on-line according to the present invention includes at least one web server computer designed for serving a host of computer browsers and providing said browsers with the capability to participate in various auctions, where each auction is of a single purchase offer, at a specified time, with a specified number of the goods under the purchase offer available for sale. The web server cooperates with a separate database computer, separated from the web server computer by a firewall. The database computer is accessible to the web computer server computer to allow selective retrieval of purchase offer information.

Assuming the supplier wishes to confirm the purchase of goods/services under the purchase offer, the database server takes the financial information of the buyer and sends the pertinent information to the bank system for immediate authorization. Real time feedback is preferably provided directly to the supplier. If the transaction is turned down for any reason and the auction process remains in process, the quantity figure is appropriately adjusted higher. This quantity figure was decreased once the supplier indicated his desire to accept the purchase offer.

If the transaction is authorized, then E-mail confirmation is sent by the mail server to the supplier. If the transaction is not authorized, this can also be indicated to the supplier by E-mail. With the present system, it can be appreciated that although the supplier participates in the auction process, the actual commitment to accept the purchase offer is not made until full costs are known, including the freight costs and appropriate taxes. If the supplier decides not to accept the portion of the purchase offer, the portion of the purchase offer is returned to the auction if the auction is still in progress. It can also be appreciated from the above description that the supplier is removed from the auction process as soon as a commitment to purchase is made. In this way, the final, or lowest price of the product is not known to the supplier.

The database server cooperates with each of the web server computers to allow for the rapid feed of information to the web server computers necessary to allow the supplier to be exposed to the dynamic nature of the auction. This dynamic feedback includes the results of multiple suppliers with feedback occurring in seconds as opposed to minutes hours or days. It also allows the auction system to respond to a host of simultaneous triggers. Each web server is individually servicing many suppliers. Many different auctions can be occurring at the same time and therefore each web server provides the appropriate feed back to each supplier.

The supplier's identity is also used to confirm that he was qualified to participate within the auction. Once the identity is known, non-qualified participants can be so advised and the indication to accept cancelled.

Another feature of the auction system is the ability to track the price demand nature of the product described in the purchase offer. This provides valuable marketing information to the manufacturer. For example, in trying to determine the response at different prices, companies have to conduct various tests. In contrast with typical auction systems, a lot of information regarding price and demand is immediately known. The relationship between this type of supplier and the average supplier can then be applied to provide a conventional price demand curve for the particular product. It can readily be appreciated that the computer system provides the demand price curve. In order to provide good feedback to suppliers supporting the standard HTML 2.0 type browser, only a single auction screen is provided which has the number of units remaining to be purchased, the current price and the time remaining in the auction. This type of browser is slower, but it does provide for relatively rapid feedback during the auction process.

The web server computers are application based and build each page as requested by a buyer. Large volumes of requests can be handled very quickly. Individual requests are serviced by the system within 70 milliseconds with loads up to about 90% capacity. At this point performance drops off and an additional web server is added which runs the same software to assume additional load.

The system for the auction process responds to actuation of the trigger to update the acceptances and to remove the supplier from the auction process. The additional information is gathered in a less demanding environment. The actual dynamic variables of the auction are current price, quantity remaining and time remaining are refreshed at a fast rate (typically between 5 and 10 seconds).

Figure 22:
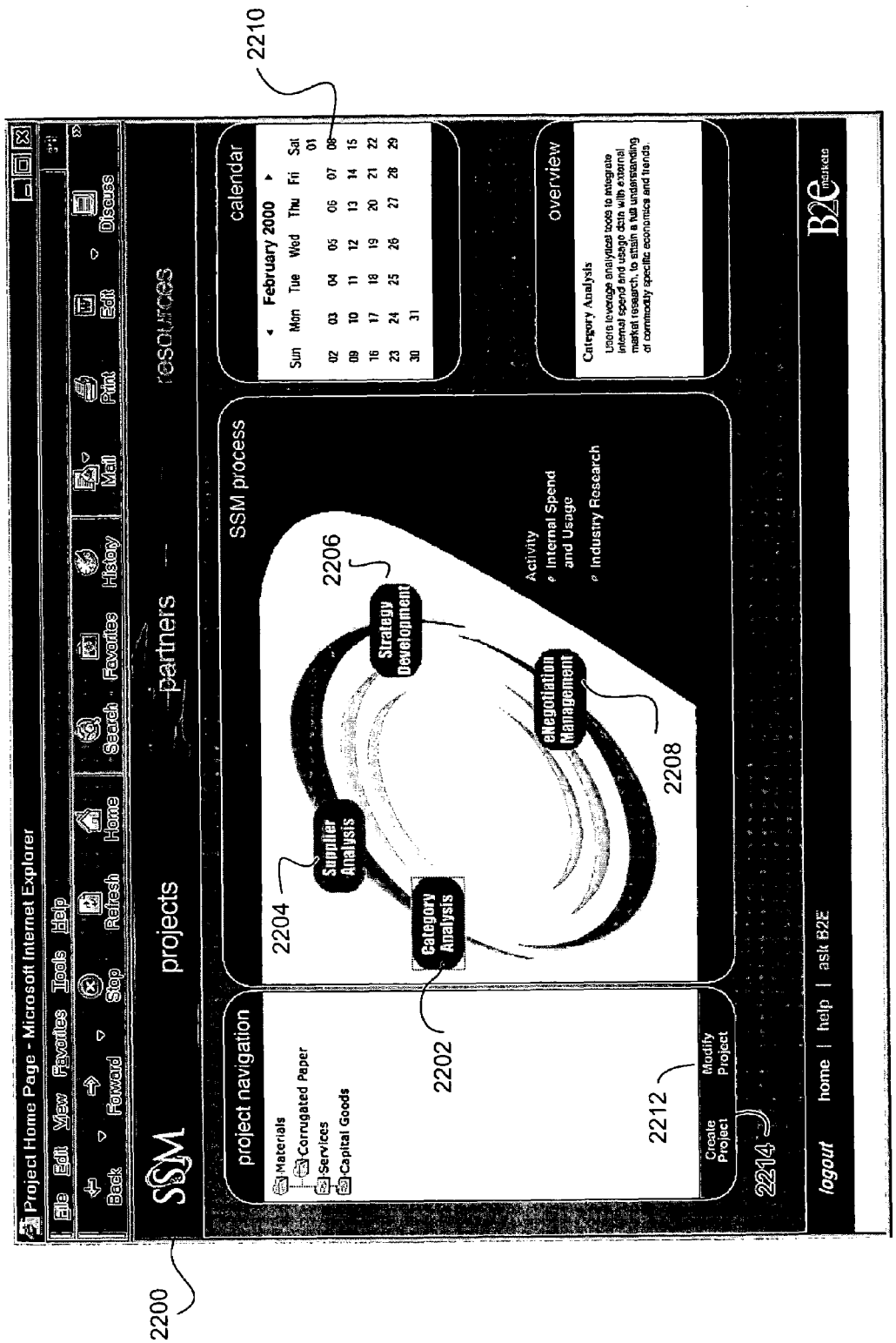
FIG. 22 illustrates a front page of a graphical user interface of an SSM system in accordance with a preferred embodiment of the present invention.

The present system is designed to allow many suppliers to participate in the auction process and rapidly process and provide feedback of acceptance of offers to buy as they are indicated many times within the last minutes of the auction. This requires the capability to rapidly process information and provide rapid updates to all suppliers. With this arrangement the dynamic nature of a reverse auction where suppliers are all present at the same location is provided without all suppliers being physically present in one location. FIG. 22 illustrates a front page of a graphical user interface 2200 of an SSM system in accordance with a preferred embodiment of the present invention. As shown, a link 2202 to a commodity analysis application is provided, as is a link 2204 to a supplier analysis application. Links 2206,2208 to strategy development and eNegotiation management applications are also displayed. Other links include a link 2210 to a calendar and links 2212,2214 to project creation and modification applications.

Figure 23:
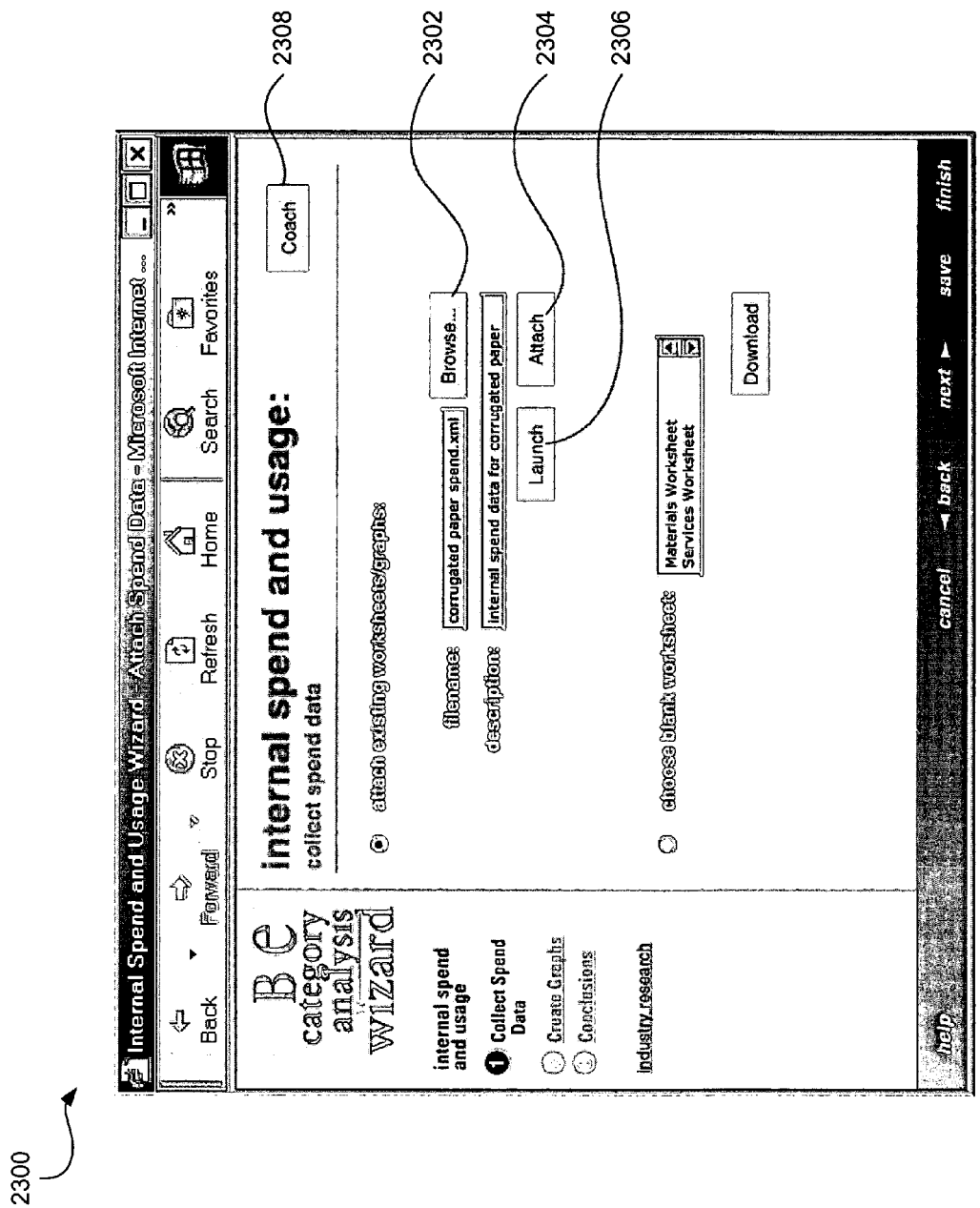
FIG. 23 depicts a screen displayed upon selection of the link to the commodity analysis application.

FIG. 23 depicts a screen 2300 displayed upon selection of the link to the commodity analysis application, which is preferably integrated with data warehousing or Accounts Payable systems. Here, spending data is collected. Existing worksheets and graphs can be attached to a data report created by the application. By selecting the browse button 2302, such worksheets and graphs can be selected from a data repository. Upon selecting the desired graph, the attach button 2304 is selected. Finally, the launch button 2306 is selected to launch the commodity analysis application. Help information can be displayed upon selection of the coach button 2308.

Figure 24:
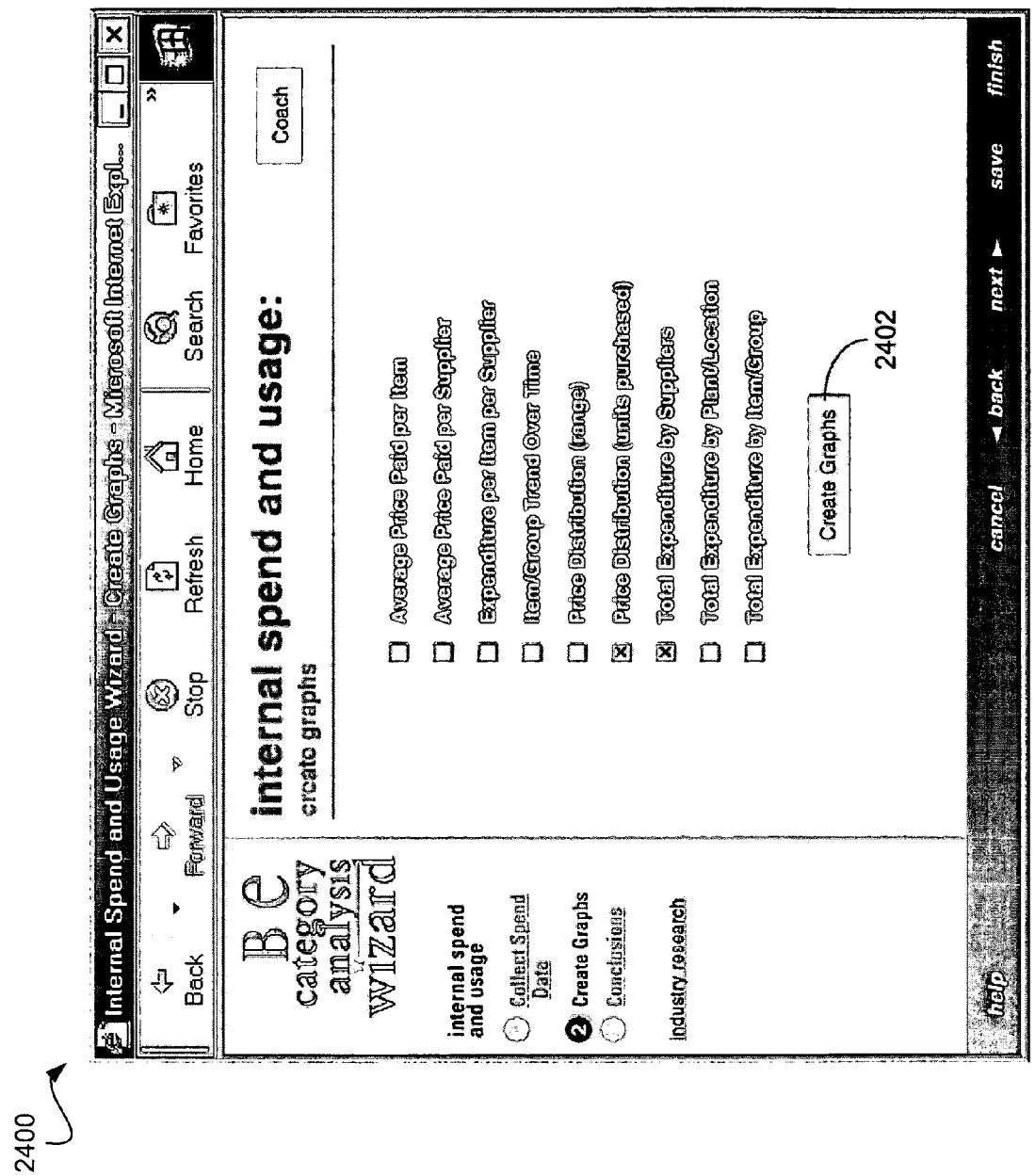
FIG. 24 illustrates a second screen displayed upon selection of the launch button of the screen shown in FIG. 23.

FIG. 24 illustrates a second screen 2400 displayed upon selection of the launch button of the screen shown in FIG. 23. This screen allows a buyer to create graphs of internal spending and usage. Options are provided for user-selection and the graphs are generated upon selection of the create graphs button 2402. In this example, Total Expenditure by suppliers and Price and Distribution (units purchased) are selected.

Figure 25:
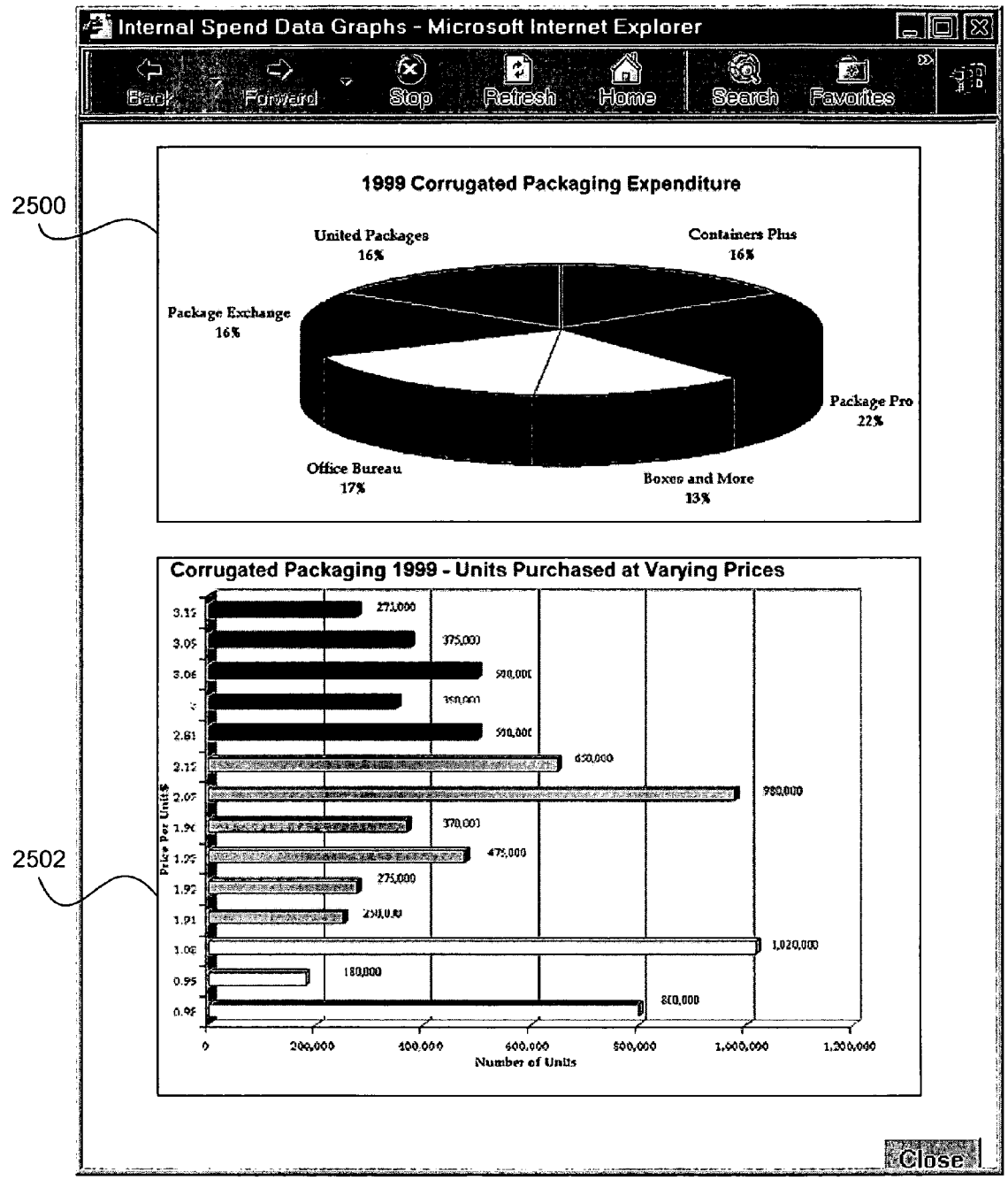
FIG. 25 depicts graphs created upon selection of the create graphs button on the interface of FIG. 24.

FIG. 25 depicts graphs 2500,2502 created upon selection of the create graphs button. One graph shows a fragmented supply base, the other shows variable pricing for like SKUs.

Figure 26:
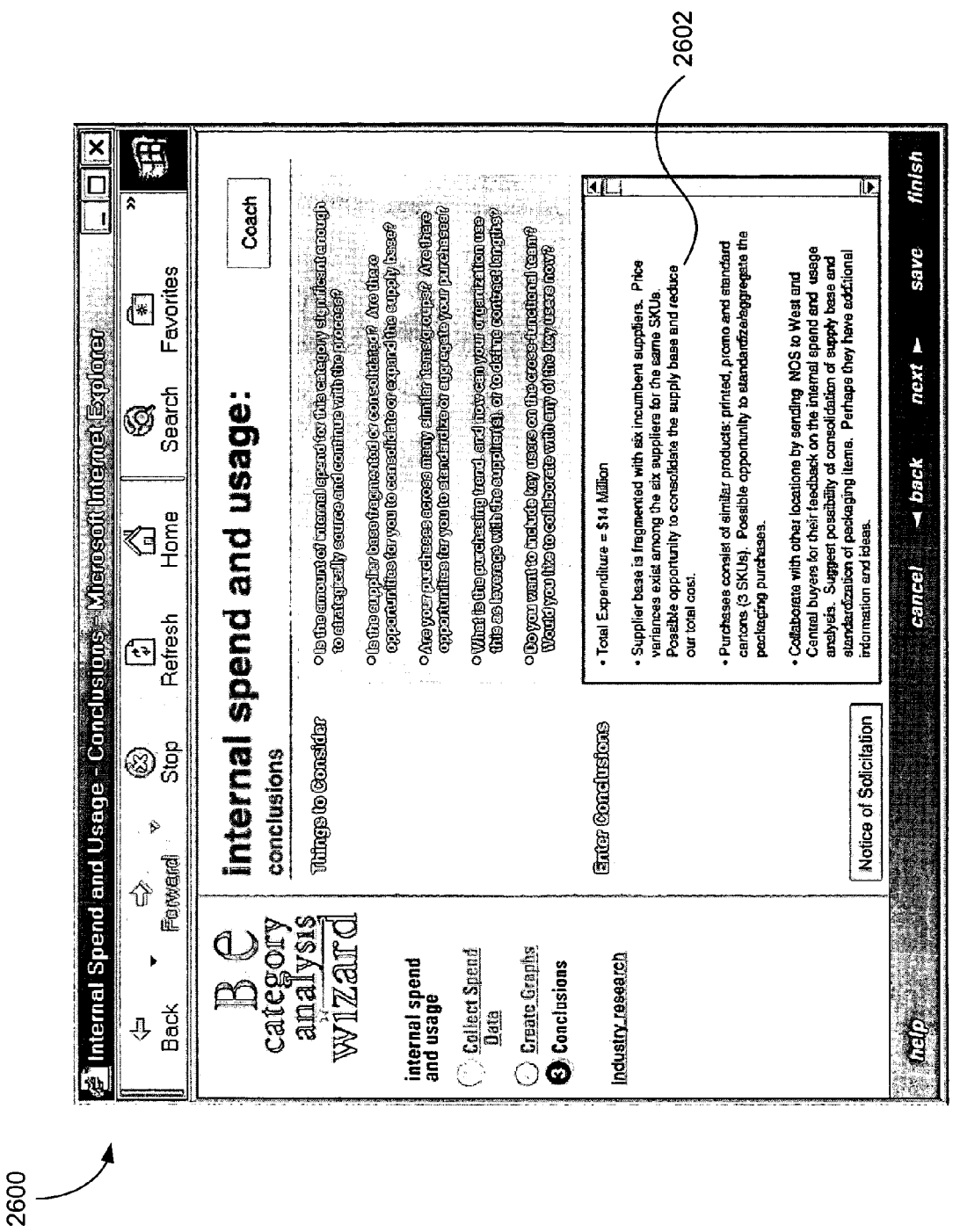
FIG. 26 illustrates a screen displaying questions supplied to assist the buyer in interpreting the data generated by the commodity analysis application.

FIG. 26 illustrates a screen 2600 displaying questions supplied to assist the buyer in interpreting the data generated by the commodity analysis application. A field 2602 is provided for the buyer to enter its conclusions.

Figure 27:
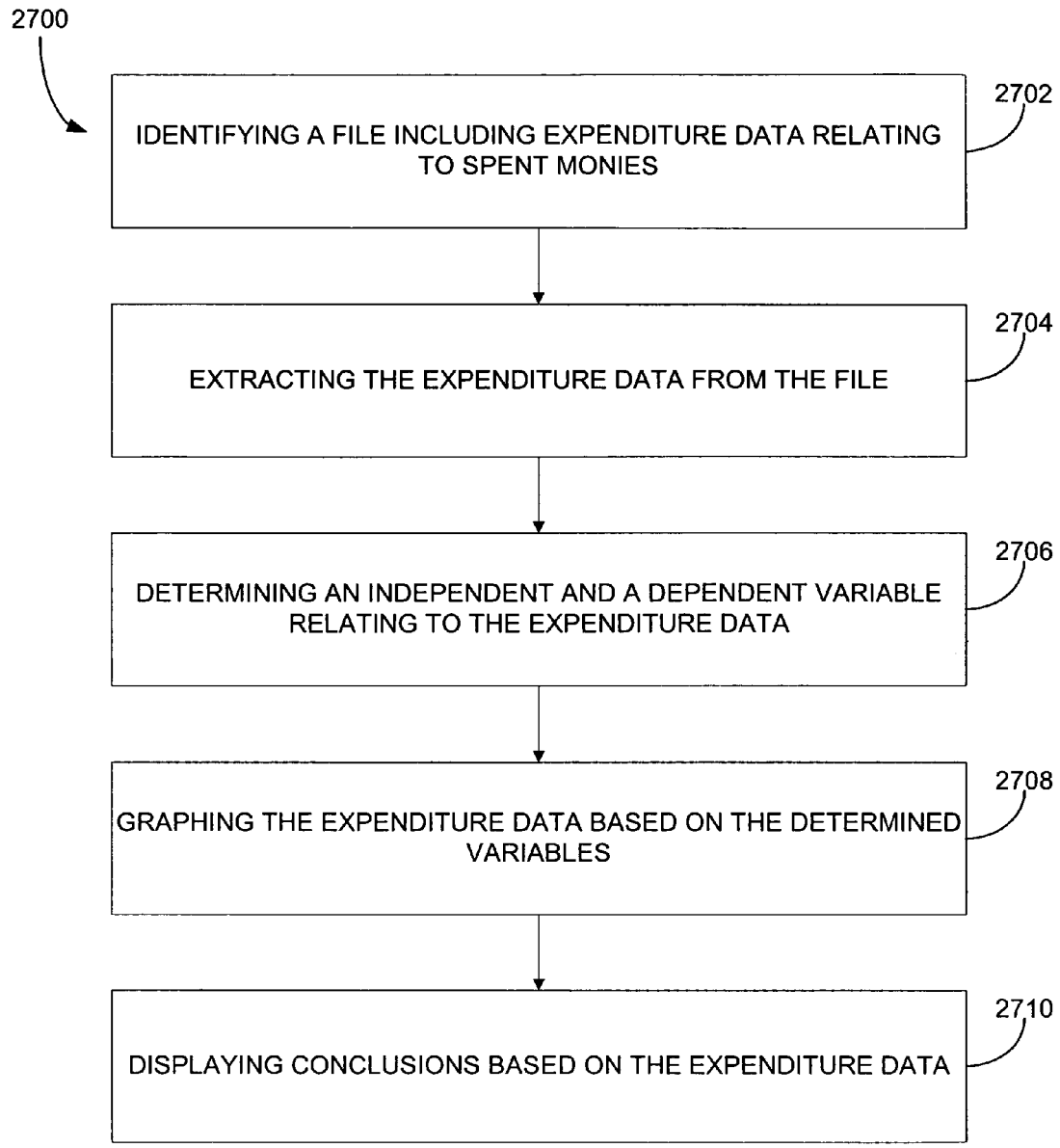
FIG. 27 is a flow diagram of a process for analyzing expenditures by category.

FIG. 27 is a flow diagram of a process 2700 for analyzing expenditures by category. A file including expenditure data relating to spent monies is identified in operation 2702. The expenditure data from the file is extracted in operation 2704. In operation 2706, an independent and a dependent variable relating to the expenditure data are determined. The expenditure data is graphed in operation 2708 based on the determined variables. In operation 2710, conclusions are displayed based on the expenditure data.

In one embodiment of the present invention, a user may be allowed to create the file including expenditure data relating to spent monies. In another embodiment, the file may be based on a materials worksheet. Optionally, the file may be based on a services worksheet.

In one aspect of the present invention, the determined variables may include price distribution and total expenditure by suppliers. In another aspect, the displayed conclusions may include recommended issues to consider. Further, a user may be allowed to input conclusions about the graphed expenditure data.

Now that the industry analysis is complete, the buyer assesses supplier capabilities. FIG. 28 shows a screen 2800 displayed upon selection of the link to the supplier analysis application from the home page. The supplier analysis application creates a supplier survey which is posted on the internet. An email is sent to the supplier to notify them of the posting and due date. This screen includes several survey-type questions that the buyer poses to suppliers and corresponding fields 2802,2804,2806,2808 that a potential supplier can fill in to answer the questions in the hope of obtaining a purchase contract from the buyer.

Figure 29:
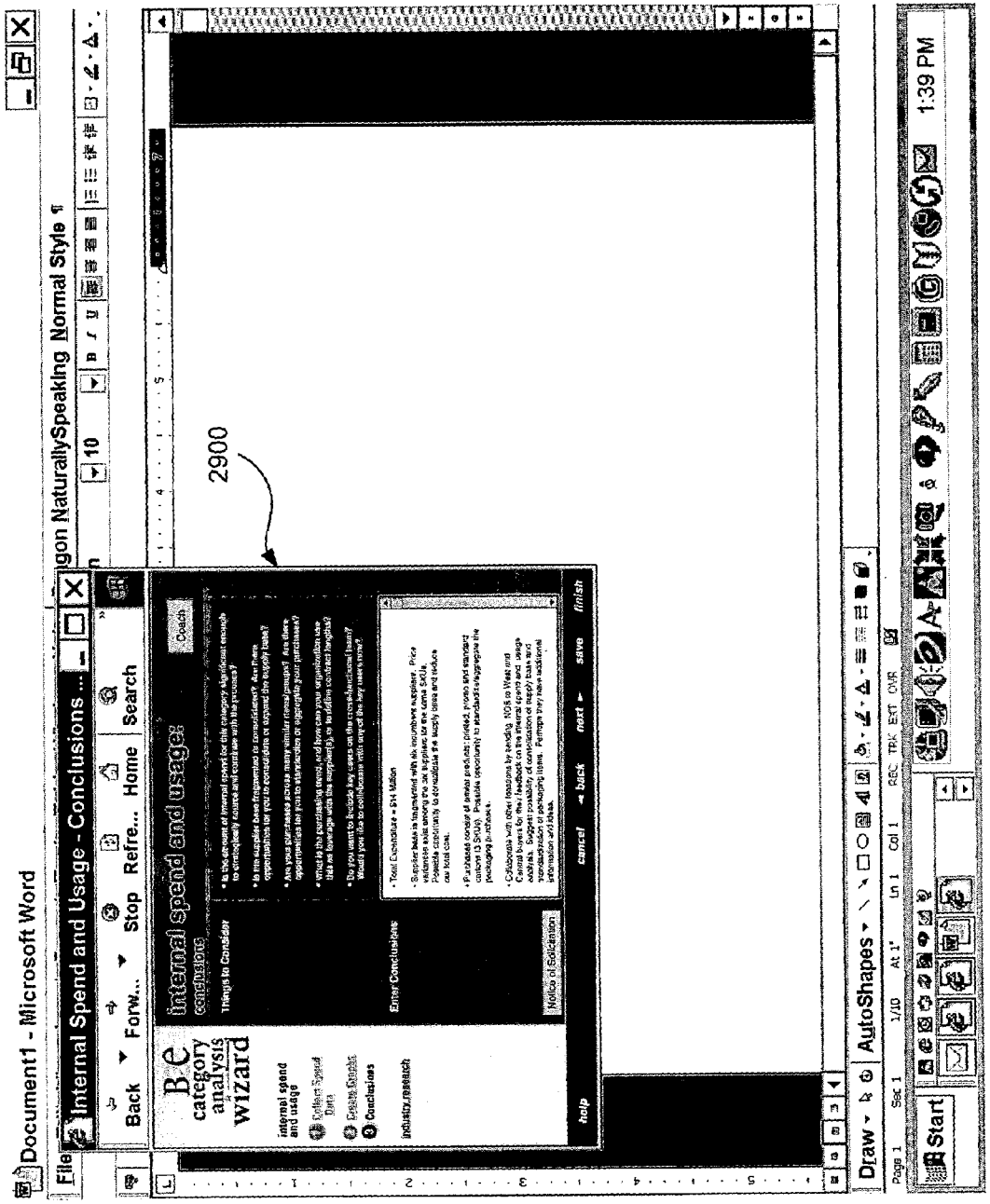
FIG. 29 illustrates a screen that summarizes supplier responses.

Questions that either the buyer selected from a template or entered him/herself are answered by each supplier. FIG. 29 illustrates a screen 2900 that summarizes the supplier responses. The buyer is able to select specific questions and associated responses to the questions for display. This allows the buyer to select the responses it prefers in an organized and easy to read format. The suppliers' responses are displayed on a response summary page (not shown).

Preferably, the buyer has already determined a negotiation strategy based on the internal, industry and supplier analyses. The buyer will want to consolidate the suppliers and get some volume leverage, tie the price to a paper index and will want to take advantage of price decreases as soon as it happens.

Figure 30:
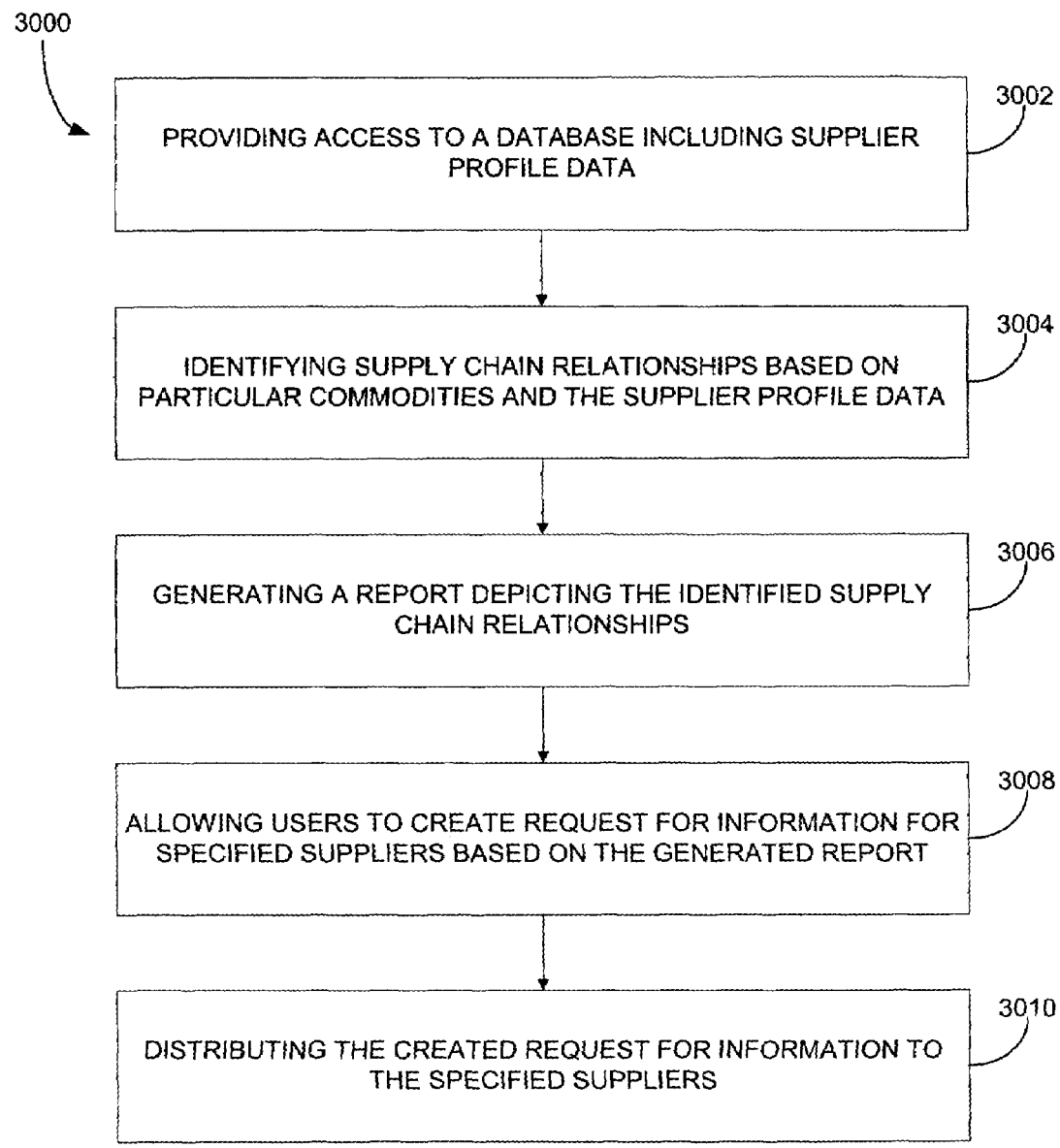
FIG. 30 is a flow diagram of a process for supplier analysis in a market management framework.

FIG. 30 is a flow diagram of a process 3000 for supplier analysis in a market management framework. Access to a database including supplier profile data is provided in operation 3002. Supply chain relationships are identified in operation 3004 based on particular commodities and the supplier profile data. A report depicting the identified supply chain relationships is generated in operation 3006. In operation 3008, users are allowed to create request for information for specified suppliers based on the generated report. The created request for information is distributed to the specified suppliers in operation 3010.

In one embodiment of the present invention, each supplier profile may include a classification, where the classification is selected from the group consisting of preferred, qualified, public, and internal. In another embodiment, the generated report may a bill of collaborators. Additionally, the generated report may further depict supply relationships through multiple tiers.

In one aspect of the present invention, the users may be allowed to review supplier response to the request for information. Optionally, a wizard interface may be utilized to assist users in creating request for information. In another aspect, links to web sites of additional suppliers may be created.

Figure 31:
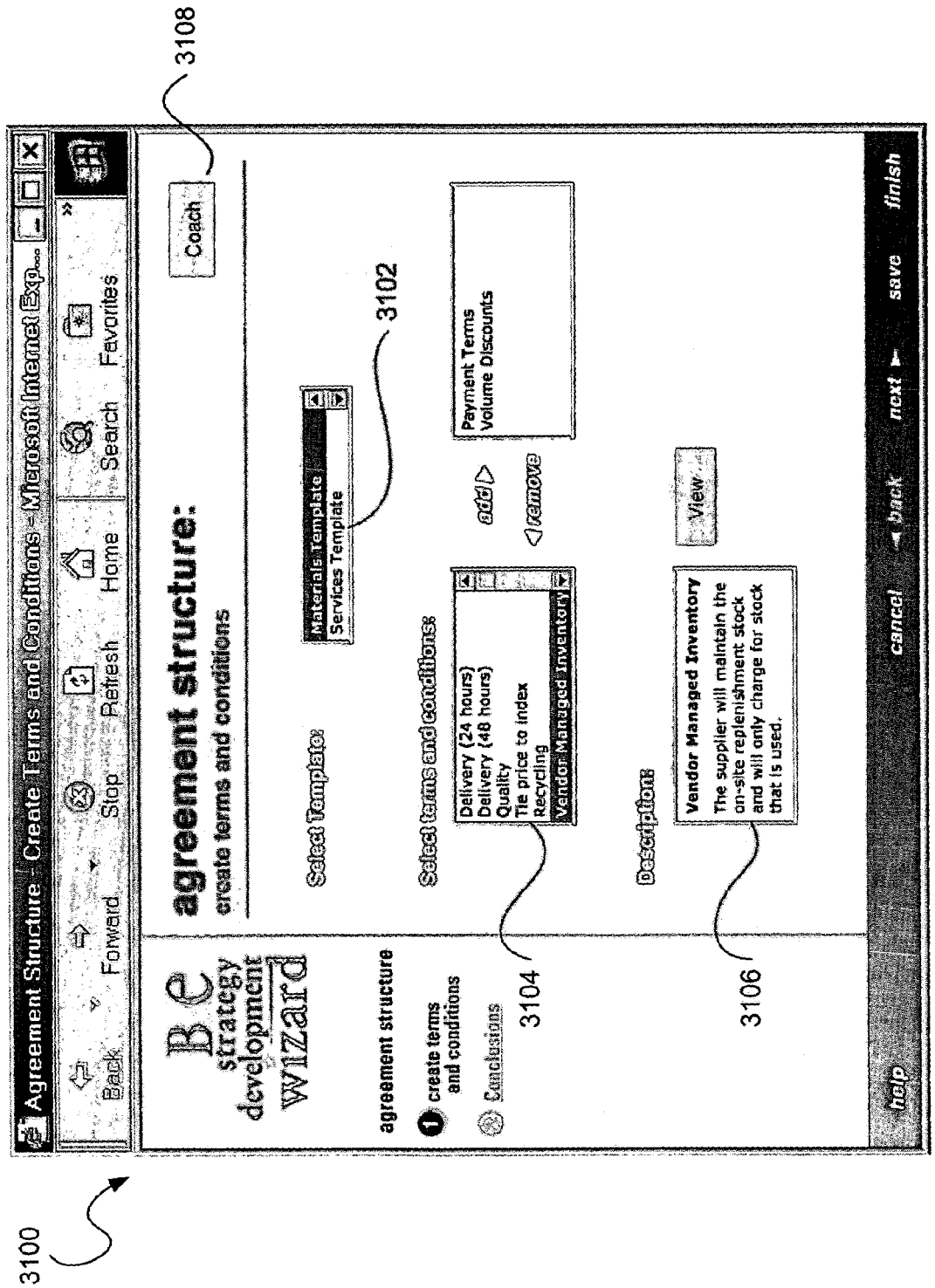
FIG. 31 illustrates a screen displayed upon selection of the link to the strategy development application.

FIG. 31 illustrates a screen 3100 displayed upon selection of the link to the strategy development application, which allows the buyer to create a terms and conditions sheet. This interface includes a field 3102 that permits the user to select a template requesting materials (goods) or services. Terms and conditions for insertion in the template can be added from field 3104. The buyer is also able to enter a clauses specific to this negotiation in field 3106. Upon selecting the template, terms and conditions, and filling in the description field, the conclusions button is selected to create the template and view strategy recommendations.

By selecting the coach button 3108, the buyer can solicit suggestions on how to approach the suppliers. Steps that outline the approach are returned.

Figure 32:
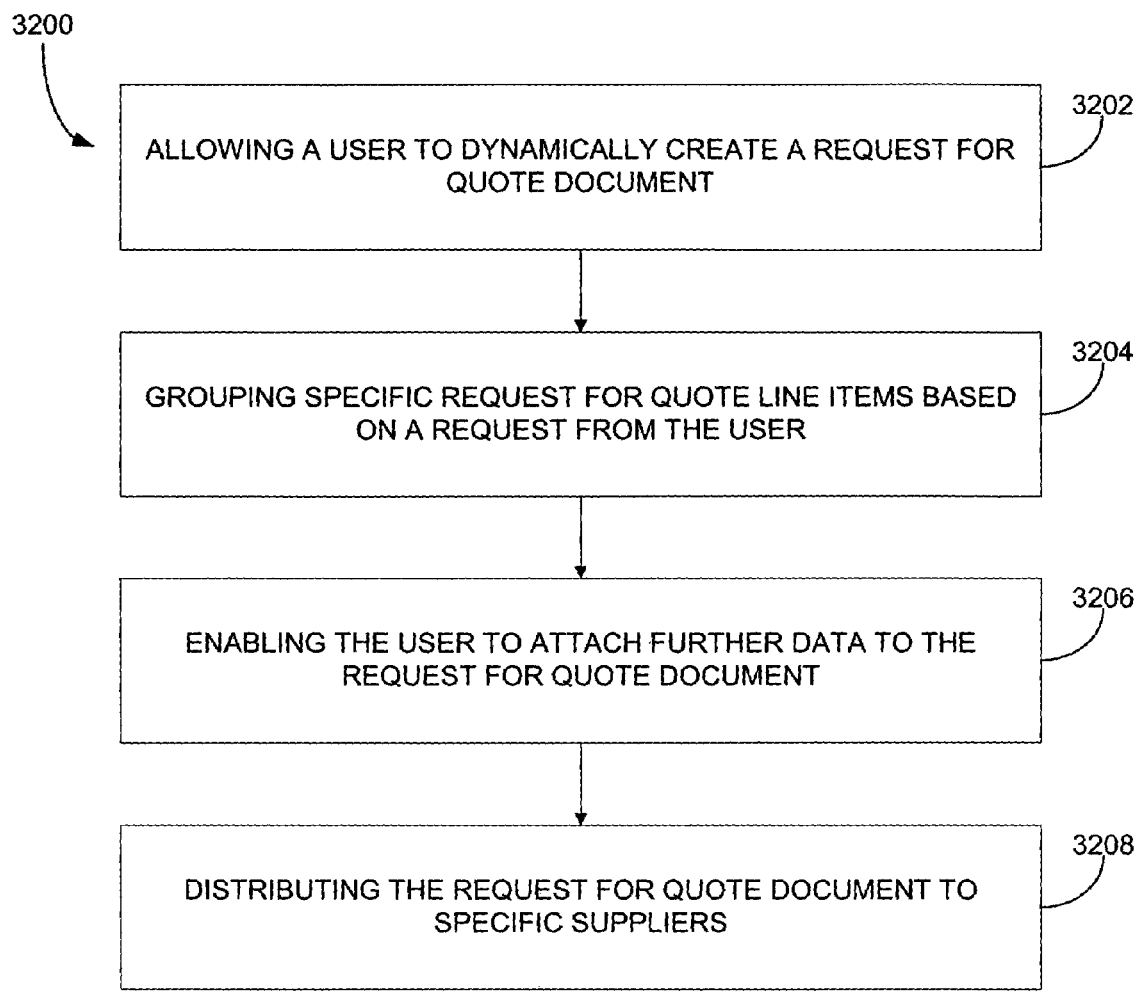
FIG. 32 is a process for strategy development in a market management framework.

FIG. 32 is a process 3200 for strategy development in a market management framework. In operation 3202, a user is allowed to dynamically create a request for quote document. Specific request for quote line items are grouped in operation 3204 based on a request from the user. In operation 3206, the user is enabled to attach further data to the request for quote document. The request for quote document is distributed to specific suppliers in operation 3208.

In one embodiment of the present invention, the request for quote document may be created via wizard interface. Optionally, the wizard interface may allow the user to access category specific templates having cost drivers. In addition, the attached data may include parts drawings.

In one aspect of the present invention, the attached data may include item attributes information. In another aspect, the user may be allowed to determine negotiation event scheduling. Optionally, the user may be allowed to provide negotiation event notification.

Figure 33:
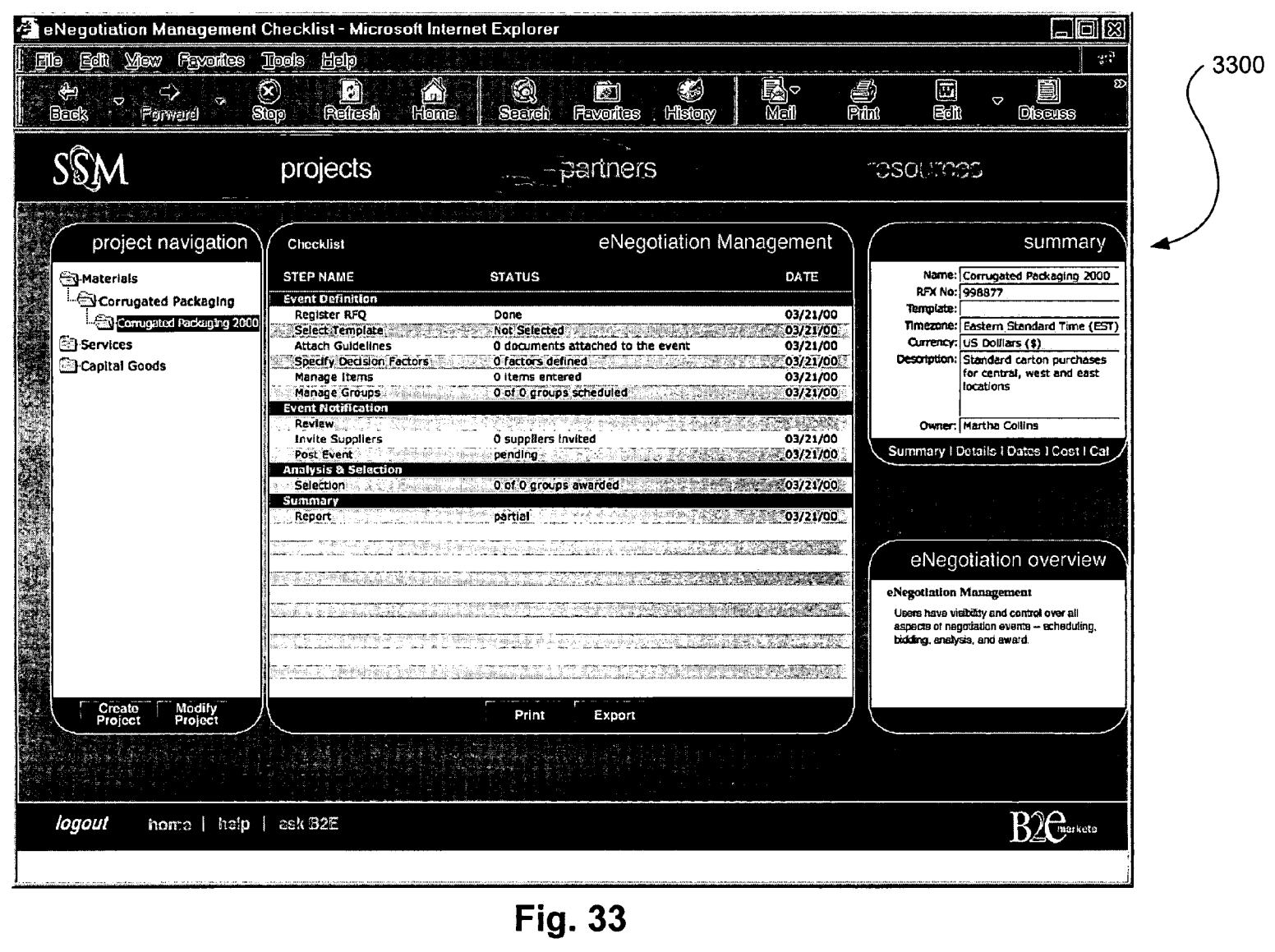

FIG. 33 depicts a screen 3300 displayed upon selection of the link to the eNegotiation management application. This interface assists the buyer in managing its negotiations with a potential supplier(s) and shows a status of all tasks. Event definitions are displayed, preferably in chronological order, as are event notifications. A number of suppliers selected for negotiations and/or for presentment with a purchase offer is also displayed. Additionally, a status of a summary report is displayed.

Figure 34:
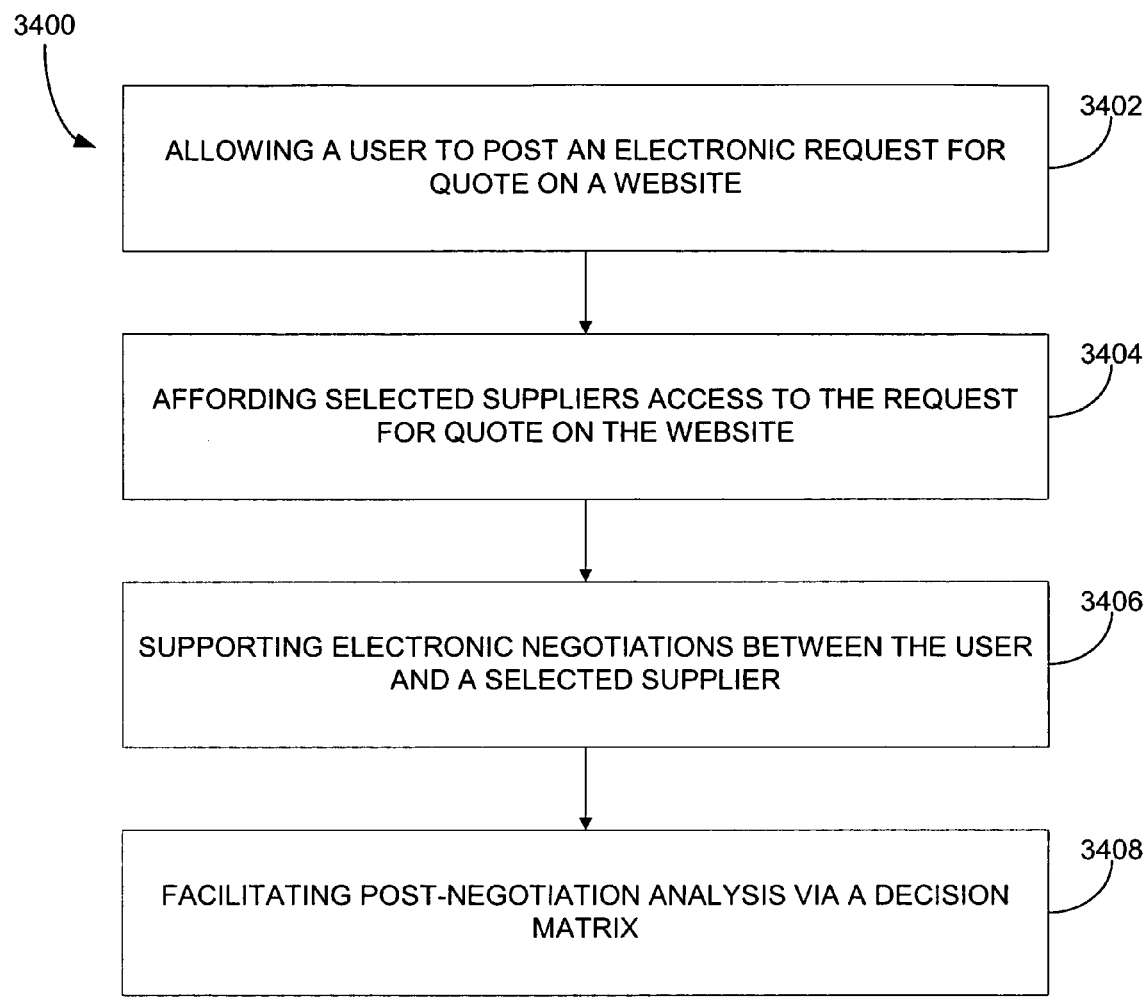
FIG. 34 is a flow diagram of a process for managing electronic negotiations.

FIG. 34 is a flow diagram of a process 3400 for managing electronic negotiations. In operation 3402, a user is allowed to post an electronic request for quote on a website. In operation 3404, selected suppliers are afforded access to the request for quote on the website. Electronic negotiations are supported between the user and a selected supplier in operation 3406. Post-negotiation analysis is facilitated in operation 3408 via a decision matrix.

In one embodiment of the present invention, the website may be a secure website. Optionally, the website may be a $3^{rd}$ party website. In another embodiment, electronic invitation messages regarding the request for quote are provided to the selected suppliers.

In one aspect of the present invention, the negotiations may include private offer negotiations, and total cost bidding with the selected supplier. In another aspect, the user can limit price visibility.

Figure 35:
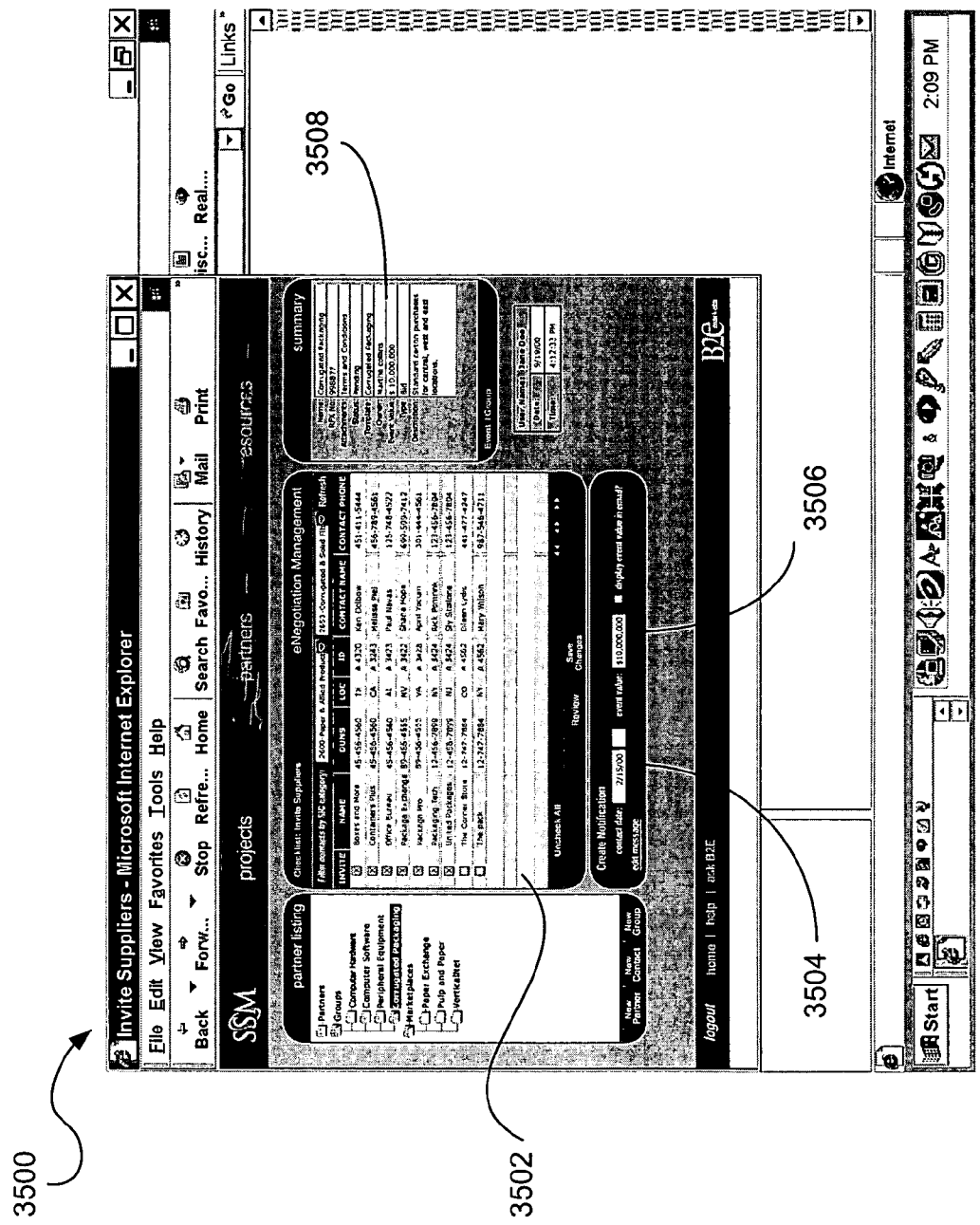
FIG. 35 depicts a screen that the buyer can use to invite suppliers of a particular product to a negotiation.

FIG. 35 depicts a screen 3500 that the buyer can use to invite suppliers of a particular product, corrugated packaging in this example, to a negotiation, preferably via email. The buyer selects suppliers by selecting a box 3502 associated with each supplier to be invited. A date that the notification is to be sent is entered in field 3504. An offered purchase price can also be entered in field 3506. A summary 3508 is also displayed, which lists the attachments, purchase offer, description of the goods or services desired, etc. that will be sent to the invited suppliers.

Figure 36:
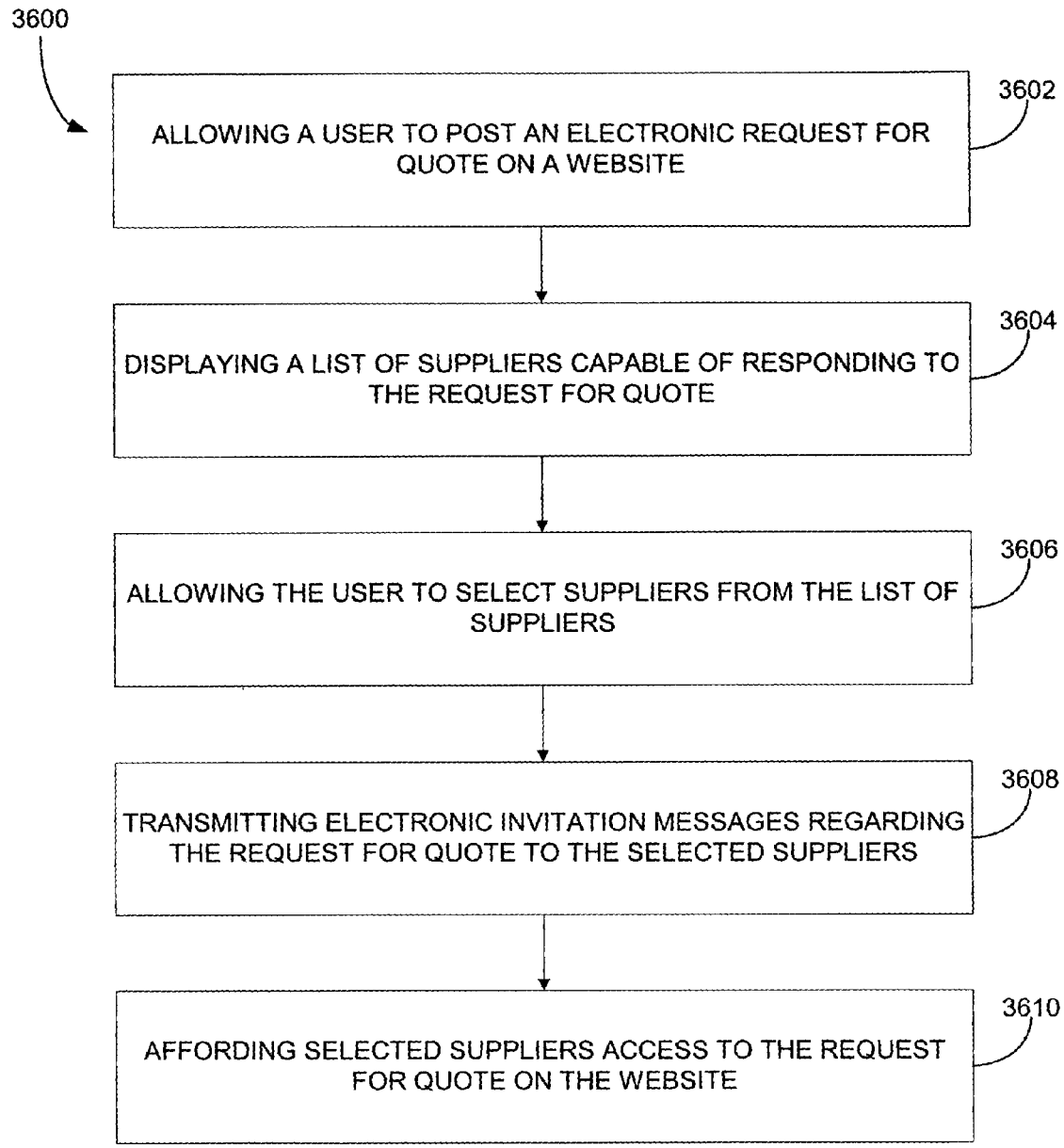
FIG. 36 is a flowchart of a process for inviting suppliers to negotiations in a market management framework.

FIG. 36 is a flowchart of a process 3600 for inviting suppliers to negotiations in a market management framework. A user is allowed to post an electronic request for quote on a website in operation 3602. In operation 3604, a list of suppliers capable of responding to the request for quote is displayed. The user is allowed to select suppliers from the list of suppliers in operation 3606. Electronic invitation messages regarding the request for quote are transmitted in operation 3608 to the selected suppliers. In operation 3610, selected suppliers are afforded access to the request for quote on the website.

In one embodiment of the present invention, the website may be a secure website. Optionally, the website may be a $3^{rd}$ party website. In another embodiment, electronic negotiations between the user and a selected supplier may be supported.

In one aspect of the present invention, the negotiations may include private offer negotiations, and total cost bidding with the selected supplier. Further, the user may optionally limit price visibility.

Figure 37:
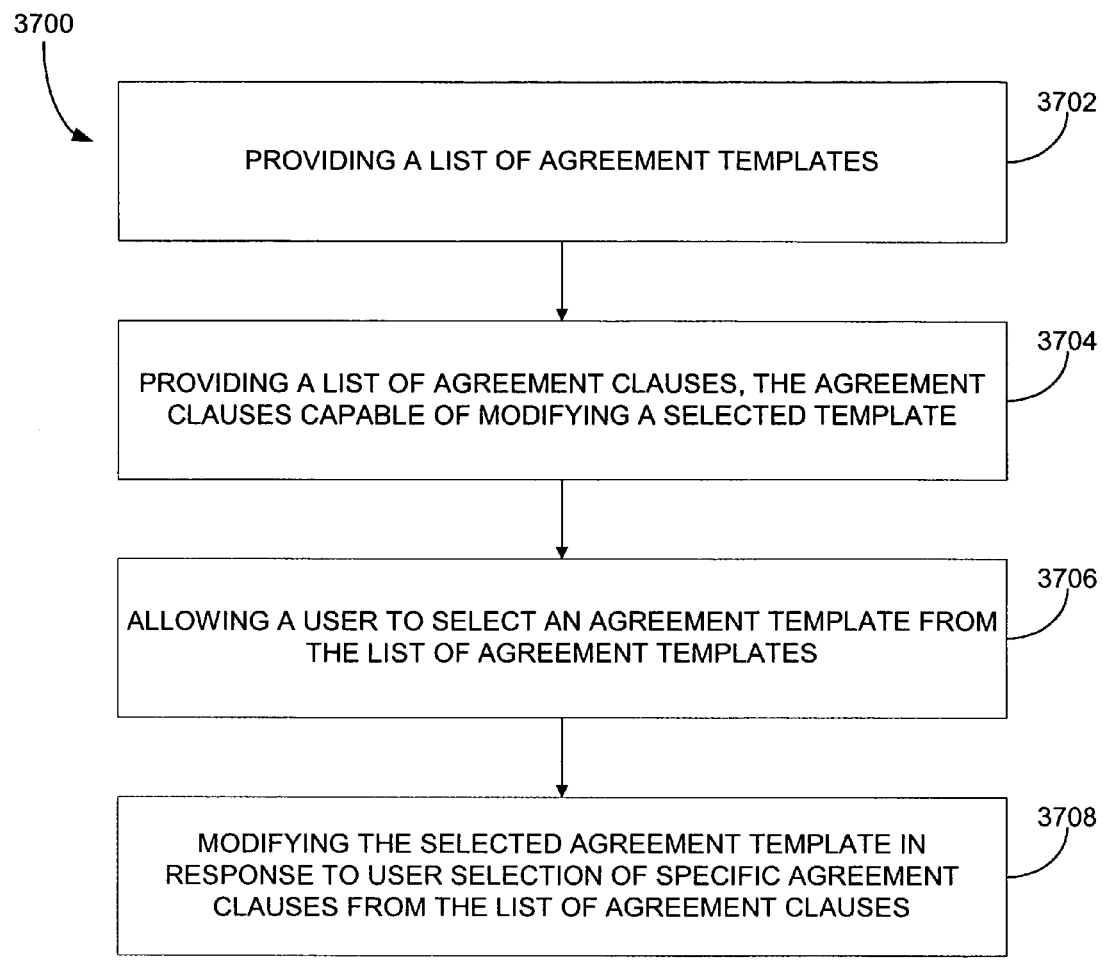
FIG. 37 is a flowchart of a process for facilitating agreement creation in a market management framework.

FIG. 37 is a flowchart of a process 3700 for facilitating agreement creation in a market management framework. A list of agreement templates is provided in operation 3702. A list of agreement clauses is provided in operation 3704, where the agreement clauses are capable of modifying a selected template. In operation 3706, a user is allowed to select an agreement template from the list of agreement templates. In operation 3708, the selected agreement template is modified in response to user selection of specific agreement clauses from the list of agreement clauses.

In one embodiment of the present invention, a list of selected agreement clauses may be provided. In another embodiment, an agreement clause may be removed from the list of selected agreement clauses in response to a user request. Optionally, modifications to the agreement template may be removed based on the removed agreement clause.

In one aspect of the present invention, a description of a specific agreement clause may be displayed in response to a user request. In another aspect, coaching on agreement creation may be provided in response to a user request.

Figure 38:
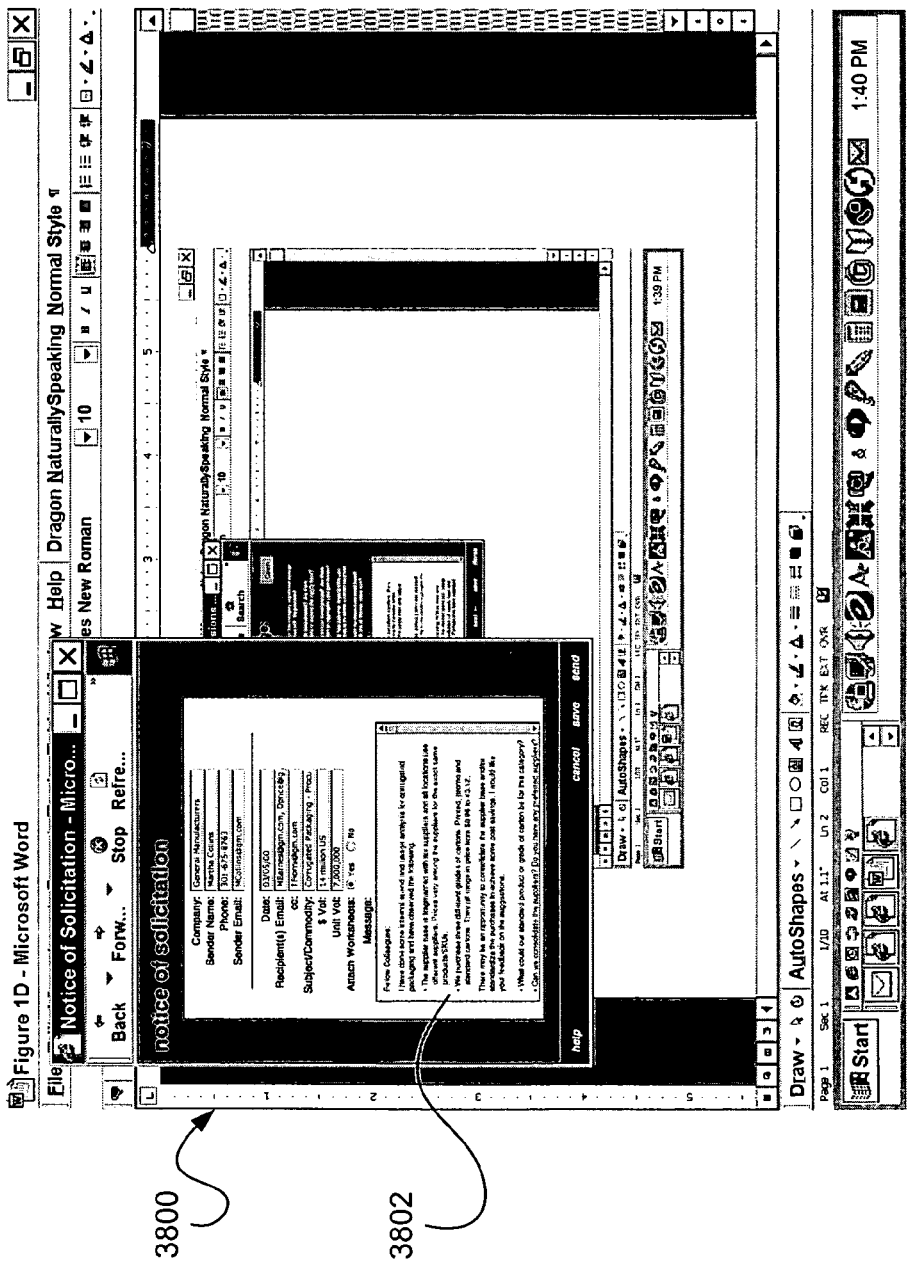
FIG. 38 depicts a screen displaying a template that allows the buyer to create a notice of solicitation.

FIG. 38 depicts a screen 3800 displaying a template that allows the buyer to create a notice of solicitation. As shown, several fields identifying the buyer and seller, the goods desired, an offer, etc. are presented. The buyer can also enter a message in field 3802.

Figure 39:
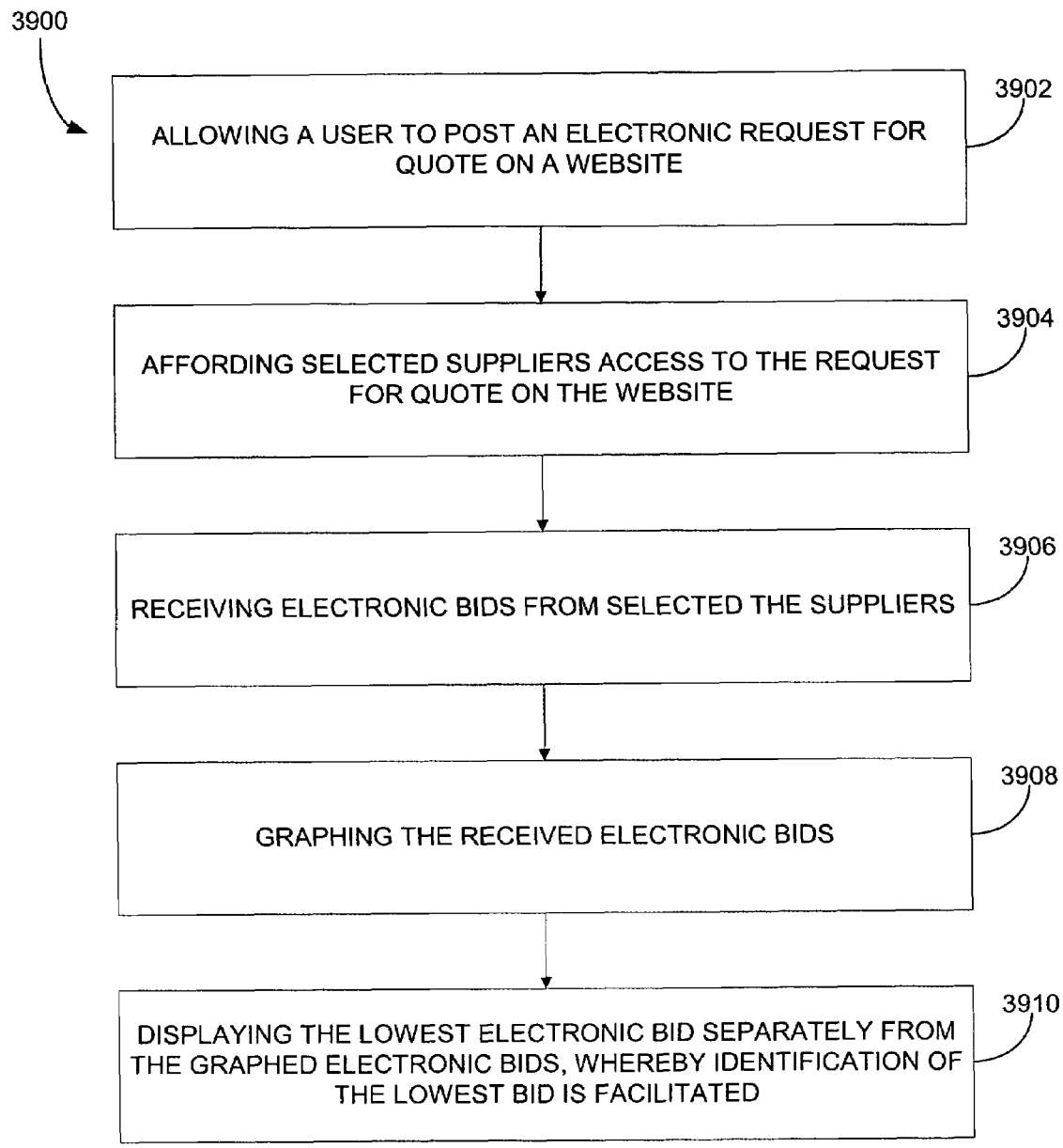
FIG. 39 is a process for monitoring negotiations in a market management framework.

FIG. 39 is a process 3900 for monitoring negotiations in a market management framework. In operation 3902, a user is allowed to post an electronic request for quote on a website. Selected suppliers are afforded access to the request for quote on the website in operation 3904. In operation 3906, electronic bids are received from the selected suppliers. The received electronic bids are graphed in operation 3908. In operation 3910, the lowest electronic bid is displayed separately from the graphed electronic bids, whereby identification of the lowest bid is facilitated.

In one embodiment of the present invention, the website may be a secure website. Optionally, the website may be a $3^{rd}$ party website.

In one aspect of the present invention, electronic invitation messages regarding the request for quote may be provided to the selected suppliers. In addition, the electronic bids may include total cost bids with the selected supplier. Further, the user may limit price visibility.

A Resources Page (not shown) can be accessed that has archived projects, white papers, best practices, case studies and weblinks. This way, the buyer can do research without necessarily having created a project. Industry weblinks are shown by industry and are maintained and updated by an SSM provider. The weblinks take the buyer to external websites where it can gather industry news, relevant articles, info on new products, etc. If the buyer decides that he/she has too much to do, the buyer can request an industry analysis from the SSM provider. The buyer can also ask the SSM provider for expert procurement advice to handle questions or requests.

In an example, the buyer can also ask questions to request corrugated packaging pricing trend and market share info. The SSM provider replies with pricing trend and market share information and graphs.

Figure 40:
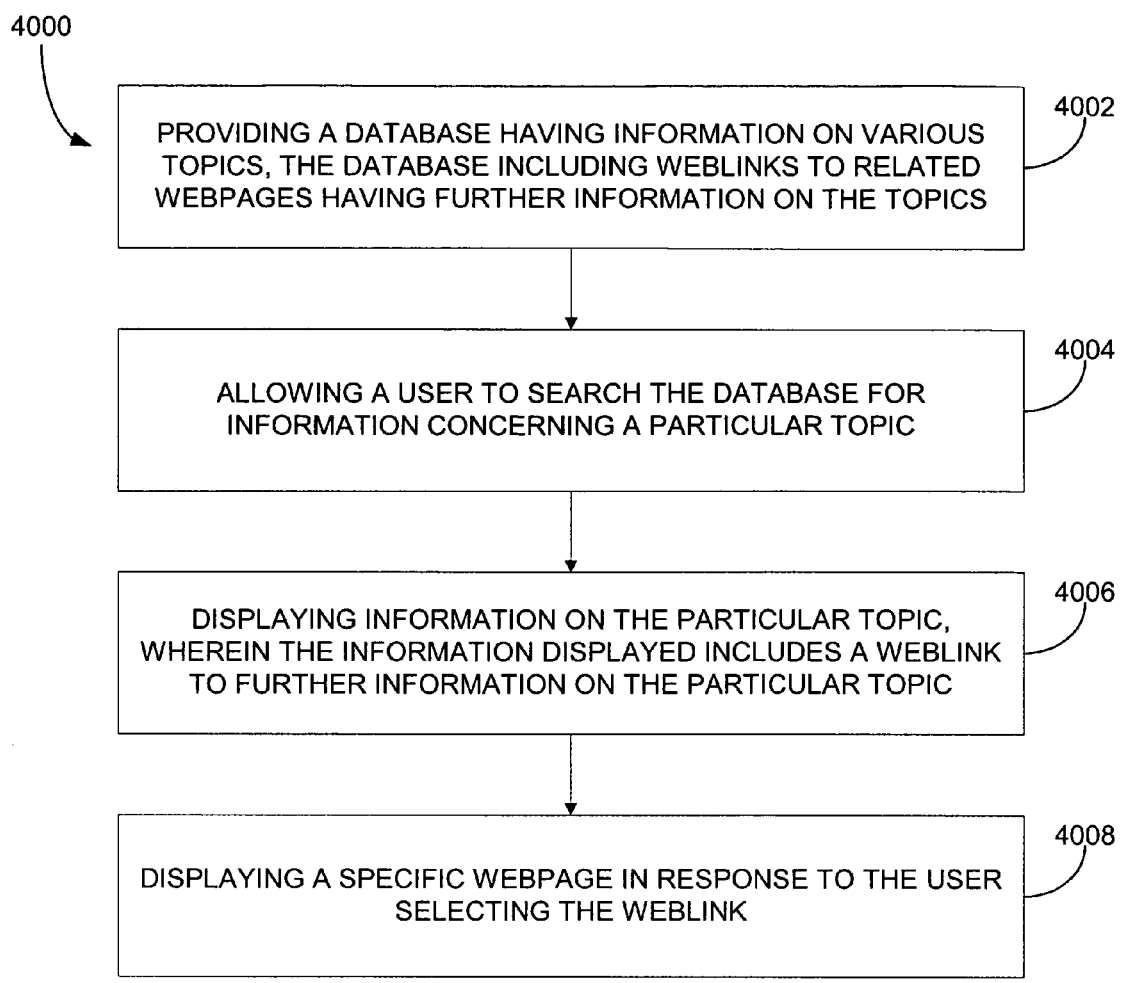
FIG. 40 is a flowchart of a process for affording a resource page.

FIG. 40 is a flowchart of a process 4000 for affording a resource page. A database having information on various topics is provided in operation 4002. Preferably, the database includes weblinks to related webpages having further information on the topics. In operation 4004, a user is allowed to search the database for information concerning a particular topic. Information on the particular topic is displayed in operation 4006, wherein the information displayed includes a weblink to further information on the particular topic. In operation 4008, a specific webpage is displayed in response to the user selecting the weblink.

In one embodiment of the present invention, the database may include archive projects. Optionally, the database may include white papers on selected topics. In another embodiment, the displayed weblinks may be organized according to specific competitor/company information whereby the user can obtain details on potential suppliers.

In one aspect of the present invention, the may user search the database using a directory structure. Additionally, the database may include information concerning suppliers.

In an interactive embodiment of the invention, an interactive system is implemented over a distributed computer network. While in a preferred embodiment the network is the Internet, the invention is equally applicable to any distributed network, whether public or private.

A database contains information relating to the simulated merchants, goods being offered for sale, and user profiles. A management host processor communicates with the database and with a database engine. Management host processor performs administrative and management functions in maintaining the database, processing merchandise orders, and feeding real-time data to negotiating sessions. For example, the processor may include an interface to external data sources such as news wires, stock tickers, etc. Such information may be provided to the user during a negotiating session as information of interest to the user.

The database engine is in communication with a server that is part of a distributed network, such as the Internet, and in particular the World Wide Web. Database engine may be implemented as part of the server. A client is also part of the network. The client may be implemented by a desktop computer, laptop computer, or any other type of computer, including web browser software enabling the client to communicate with and receive and process data from the server.

The database preferably is a Relational Data Base Management System (RDBMS), as well known in the art.

The database engine is preferably implemented through the server. The database may communicate with the database engine and management host processor through conventional Open Data Base Connectivity (ODBC) protocol, while the host processor may communicate with the database engine through TCP/IP (Transmission Control Protocol/Internet Protocol) protocol.

The database stores a plurality of information relating to users, merchants and merchandise, which is processed by the database engine during live, interactive negotiating sessions with clients. The database includes user profiles and history data, business rules and logic data, merchandise brand interface data, upsell interface data, merchant character model behavior data, merchant character graphics data, a merchant dialogue generator, a product inventory interface, and a business reporting interface.

In a preferred embodiment, the system Web site contains hyperlink graphical portraits of the various merchants whose character information is stored in the database. A user may mouse-click on a selected portrait to link to hyperlinked text describing the items of merchandise being offered by that merchant. Clicking on the merchandise description will being the negotiating process.

The buyer begins the negotiating process by making an initial offer to purchase the selected merchandise at a particular price, accompanied by dialogue intended to get the supplier to a favorable emotional state to accept the buyer's offer. The supplier then would respond with a counteroffer.

In addition to making an offer to purchase, the buyer may ask the customer a yes/no question. This is intended to build a demographic profile of the supplier which will be stored and used in later sessions with the same supplier. The supplier's response will also be used to calculate a new emotional state of the supplier which will determine the buyer's response to the supplier's counteroffer.

The buyer may further make additional offers to the supplier, such as "throw-in" memberships to consumer buying clubs and the like, if the supplier would agree to the buyer's latest price. The identification of available "throw-ins" are stored in "upsell" interface files.

The objective of the user or buyer is to interact with the supplier in a manner that would cause the supplier to agree to the buyer's monetary offer for the item at issue. In this regard, each supplier has a unique character profile as stored in the character model behavior files in the database. The supplier's mood or emotional state is conveyed to the buyer through three mechanisms. First, each time a buyer submits an offer, the character graphics are updated to a new facial expression indicative of the supplier's new emotional state. Second, textual dialogue matching the supplier's state is selected from the dialogue generator file and displayed to the buyer. Third, and perhaps more subtle, is the supplier's offer. As the supplier enters more negative emotional states, his or her offers will become less generous, and vice versa. The challenge for the buyer is to interpret the supplier's mood from the various indicators and respond with a counteroffer and associated mood that are appropriate for the perceived mood of the supplier.

The supplier's mood is calculated by the database engine in response to data retrieved from the database relating to the supplier profile and the buyer profile (if any). For example, a supplier whose state is "Sad" receives a bid from a buyer with an "apologetic" stance. However, the actual emotional state reached is derived from an algorithm taking into account additional input such as the value of the buyer's offer, the length of time that the supplier and buyer have been engaged, the number of offers and counteroffers already made, the results of the buyer's last negotiation, the results of the seller's previous negotiating sessions, etc.

At the beginning of a negotiating session, the database engine may determine an initial emotional state of the supplier from various retrieved data, including the supplier's emotional state from immediately preceding sessions (regardless of buyer); the supplier's state as it relates to the particular buyer based on past history of sessions with that buyer; and the buyer's historical negotiating results. These factors can be weighted in any desired manner to arrive at an initial state and a weighting factor that can be used to weight any state transition experienced by the supplier according to response matrix outputs.

Each time a supplier submits a new counteroffer, the database engine uses various data to compute a new supplier offer and emotional state, such as the reasonableness of the counteroffer, as determined by the divergence of the supplier's counteroffer from a predetermined expected value; the response time of the supplier; and the aggregate emotional state responses of the supplier throughout the negotiating process. Additionally, the engine may take into account the traffic volume on the site. High traffic volume indicating high levels of supplier interest could be used to cut short the present process.

The business rules and logic are structured based on gathered knowledge regarding the product at issue, the most reasonable price the product may be acquired at through other channels, and a targeted revenue distribution for each particular product. For example, 70% of the negotiations might be targeted to result in a sales price .+-0.2% of the suggested retail price, 14% at a price 2-10% above the retail price, 10% at a price 2-6% below the normal retail price, 5% at a price 6-8% below suggested retail, and 1% at a price 8-10% below suggested retail.

Ancillary features may be provided to the Web site to increase user interest and involvement. For example, hyperlinks may be provided to biographical sketches of each supplier where a user may learn important clues to the supplier's behavior. A user may hyperlink to an "eavesdropping" screen where the user may observe a negotiation being carried out by another user. An "Upcoming Merchandise" screen may preview future goods that will available for sale. "A Hall of Frame" screen may list the most successful "hagglers" at the site; a tutorial area may be provided where a buyer can engage in a simulated negotiating session to familiarize herself with the process.

Figure 41:
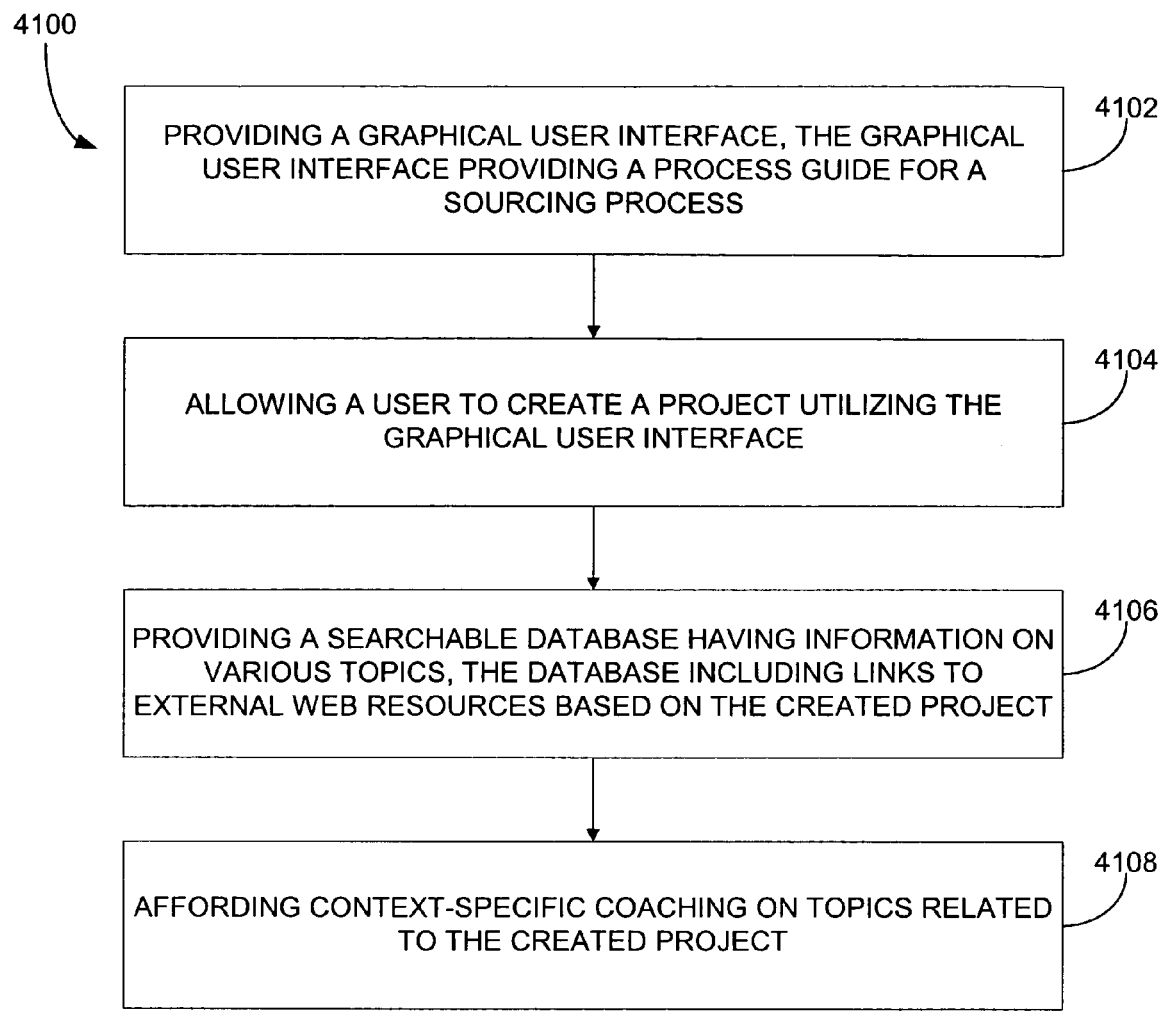
FIG. 41 depicts a process for affording project management in a market management framework.

FIG. 41 depicts a process 4100 for affording project management in a market management framework. A graphical user interface is provided in operation 4102, where the graphical user interface provides a process guide for a sourcing process.

In operation 4104, a user is allowed to create a project utilizing the graphical user interface. A searchable database having information on various topics is provided in operation 4106. Preferably, the database includes links to external web resources based on the created project. In operation 4108, context-specific coaching is provided on topics related to the created project.

In one embodiment of the present invention, the user is allowed to organize documents related to the created project. In another embodiment, a user profile for the user is created. Optionally, the user profile may include specific data views and permissions for the user.

In another embodiment of the present invention, trader partner on-line conferencing is provided. In another aspect, the context-specific coaching may include utilizing software agents to search for requested information.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method in a computer system for analyzing expenditures by category in an electronic commerce environment, comprising the steps of:
   (a) identifying an electronic file including expenditure data relating to spent monies, wherein the expenditure data is derived with the computer system from a purchasing module including data relating to internal spending of the spent monies, and from a performance service offered by subscription and accessible by the computer system to identify with the performance service an industry analysis related to the spent monies selected by the computer system from a plurality of unique industry analyses, and wherein the expenditure data includes a total cost of ownership;
   (b) extracting with the computer system the expenditure data from the file;
   (c) determining an independent variable and a dependent variable relating to the expenditure data;
   (d) graphing the expenditure data based on the independent variable and the dependent variable with the computer system.

2. A method as recited in claim 1, further comprising the step of allowing a user to create the file including expenditure data relating to spent monies.

3. A method as recited in claim 1, wherein the file is based on an electronic materials worksheet.

4. A method as recited in claim 1, wherein the file is based on an electronic service worksheet.

5. A method as recited in claim 1, wherein the independent variable and the dependent variable determined in the step of determining include price distribution and total expenditure by suppliers.

6. A method as recited in claim 1, wherein the conclusions displayed in the step of displaying include recommended issues to consider.

7. A method for as recited in claim 1, further comprising the step of allowing a user to input conclusions into the computer system about the expenditure data graphed in the step of graphing.

8. A computer program embodied on a computer readable medium for analyzing expenditures by category, comprising:
   (a) an identifying code segment for identifying a file including expenditure data relating to spent monies, wherein the expenditure data is derived from a purchasing module including data relating to internal spending of the spent monies, and from a performance service offered by subscription and accessible by the computer system to identify with the performance service an industry analysis related to the spent monies selected by the computer system from a plurality of unique industry analyses, and wherein the expenditure data includes a total cost of ownership;
   (b) an extracting code segment for extracting the expenditure data from the file;
   (c) a determining code segment for determining an independent variable and a dependent variable relating to the expenditure data;
   (d) a graphing code segment for graphing the expenditure data based on the independent variable and the dependent variable determined by the determining code segment.

9. A computer program as recited in claim 8, further comprising a creating code segment for allowing a user to create the file including expenditure data relating to spent monies.

10. A computer program as recited in claim 8, wherein the file is based on a materials worksheet.

11. A computer program as recited in claim 8, wherein the file is based on a services worksheet.

12. A computer program as recited in claim 8, wherein the independent variable and the dependent variable determined by the determining code segment include price distribution and total expenditure by suppliers.

13. A computer program as recited in claim 8, wherein the conclusions displayed by the displaying code segment include recommended issues to consider.

14. A computer program as recited in claim 8, further comprising an inputting code segment for allowing a user to input conclusions about the expenditure data graphed by the graphing code segment.

15. A computer system for analyzing expenditures by category, comprising:
   (a) identifying logic for identifying a file including expenditure data relating to spent monies, wherein the expenditure data is derived from a purchasing module including data relating to internal spending of the spent monies, and from a performance service offered by subscription and accessible by the computer system to identify with the performance service an industry analysis related to the spent monies selected by the computer system from a plurality of unique industry analyses, and wherein the expenditure data includes a total cost of ownership;
   (b) extracting logic for extracting the expenditure data from the file;
   (c) determining logic for determining an independent variable and a dependent variable relating to the expenditure data;
   (d) graphing logic for graphing the expenditure data based on the independent variable and the dependent variable determined by the determining logic.

16. A system as recited in claim 15, further comprising creating logic for allowing a user to create the file including expenditure data relating to spent monies.

17. A system as recited in claim 15, wherein the file is based on a materials worksheet.

18. A system as recited in claim 15, wherein the file is based on a services worksheet.

19. A system as recited in claim 15, wherein the independent variable and the dependent variable determined by the determining logic include price distribution and total expenditure by suppliers.

20. A system as recited in claim 15, wherein the conclusions displayed by the displaying logic include recommended issues to consider.

* * * * *